US009855668B2

(12) United States Patent
Bucks

(10) Patent No.: US 9,855,668 B2
(45) Date of Patent: Jan. 2, 2018

(54) SYSTEM FOR CUTTING PRODUCTS, CONTROLLER THEREFOR, METHOD FOR CUTTING PRODUCTS AND COMPUTER PROGRAM PRODUCT IMPLEMENTING SAME

(71) Applicant: FAM, Kontich (BE)

(72) Inventor: Brent L. Bucks, Lakewood Ranch, FL (US)

(73) Assignee: FAM, Kontich (BE)

( * ) Notice: Subject to any disclaimer, the term of this patent is extended or adjusted under 35 U.S.C. 154(b) by 349 days.

(21) Appl. No.: 14/056,738

(22) Filed: Oct. 17, 2013

(65) Prior Publication Data

US 2014/0041531 A1 Feb. 13, 2014

Related U.S. Application Data

(63) Continuation-in-part of application No. 14/111,410, filed as application No. PCT/EP2012/056401 on Apr. 10, 2012.

(Continued)

(51) Int. Cl.
*A47J 43/07* (2006.01)
*A47J 43/00* (2006.01)

(Continued)

(52) U.S. Cl.
CPC ............. *B26D 5/00* (2013.01); *B26D 7/0691* (2013.01); *B26D 7/27* (2013.01); *Y10T 83/04* (2015.04);

(Continued)

(58) Field of Classification Search
CPC ..... A47J 43/0711; A47J 43/0722; B26D 1/06; B26D 1/09; B26D 1/14

(Continued)

(56) References Cited

U.S. PATENT DOCUMENTS 2,660,208 A 11/1953 Calkins et al.
2,859,784 A 11/1958 Winslow et al.

(Continued)

FOREIGN PATENT DOCUMENTS

JP 45-10592 10/1965
JP 55-128406 3/1980

(Continued)

OTHER PUBLICATIONS

European Patent Office International Search Report dated Aug. 31, 2012, International Application No. PCT/EP2012/056404 (3 pages).

(Continued)

*Primary Examiner* — Michael Laflame, Jr.
(74) *Attorney, Agent, or Firm* — Koppel, Patrick, Heybl & Philpott

(57) ABSTRACT

A system comprising a plurality of apparatuses for cutting products, comprising: a base; a cutting head with at least one cutting element along the circumference of the cutting head for cutting products fed into the cutting head, the cutting head being rotatably fitted to the base; an impeller adapted for rotating concentrically within the cutting head to urge products fed into the cutting head towards the circumference of the cutting head by means of centrifugal force; a first drive mechanism for driving the rotation of the impeller at a first rotational speed setting the centrifugal force; and a second drive mechanism for driving the rotation of the cutting head at a second rotational speed, determined such with respect to the first rotational speed that the product is cut by the at least one cutting element at a predetermined cutting velocity; and a controller for controlling said apparatuses.

15 Claims, 21 Drawing Sheets

Related U.S. Application Data

(60) Provisional application No. 61/473,826, filed on Apr. 11, 2011.

(51) Int. Cl.
*B26D 1/06* (2006.01)
*B26D 1/14* (2006.01)
*B26D 5/00* (2006.01)
*B26D 7/06* (2006.01)
*B26D 7/27* (2006.01)

(52) U.S. Cl.
CPC ............ *Y10T 83/148* (2015.04); *Y10T 83/173* (2015.04); *Y10T 83/6473* (2015.04)

(58) Field of Classification Search
USPC .... 99/509, 543, 553, 564; 83/403, 932, 591, 83/592, 698.41, 698.51, 699.51, 663, 664
See application file for complete search history.

(56) References Cited

U.S. PATENT DOCUMENTS

| | | | | | |
|---|---|---|---|---|---|
| 4,134,205 | A | | 1/1979 | Heling | |
| 4,301,846 | A | * | 11/1981 | Berggren | B27L 11/02 144/162.1 |
| 4,428,263 | A | * | 1/1984 | Lindee | B26D 7/018 83/354 |
| 4,604,925 | A | * | 8/1986 | Wisdom | B26D 1/03 144/162.1 |
| 4,796,818 | A | * | 1/1989 | Thoma | B27L 11/02 144/163 |
| 6,968,765 | B2 | * | 11/2005 | King | B26D 1/03 83/403 |
| 2005/0092194 | A1 | * | 5/2005 | Bajema | A23L 1/2163 99/537 |
| 2005/0223864 | A1 | | 10/2005 | Hemelrijk | |
| 2008/0022822 | A1 | * | 1/2008 | Jacko | B26D 1/03 83/403 |
| 2008/0134850 | A1 | * | 6/2008 | Bates | B26D 1/03 83/15 |

FOREIGN PATENT DOCUMENTS

| | | |
|---|---|---|
| JP | 61-173893 | 11/1985 |
| JP | 04-183363 | 3/1992 |
| WO | 02/068122 | 9/2002 |
| WO | 2012/139988 | 10/2012 |
| WO | 2012/139991 | 10/2012 |

OTHER PUBLICATIONS

Belgian Search Report dated Aug. 3, 2012, for Belgian Patent Application No. BE 201100295 (9 pages).
European Patent Office International Search Report dated Aug. 14, 2012, International Application No. PCT/EP2012/056401 (3 pages).
Decision of Rejection Notice from Japanese Patent Office dated Feb. 22, 2016. Patent Application No. 2014-504271.
Russian Office Action for Russian Patent Application No. 2013148635 dated Mar. 29, 2016.

* cited by examiner

SYSTEM FOR CUTTING PRODUCTS, CONTROLLER THEREFOR, METHOD FOR CUTTING PRODUCTS AND COMPUTER PROGRAM PRODUCT IMPLEMENTING SAME

CROSS-REFERENCE TO RELATED APPLICATIONS

The present application is a continuation-in-part of U.S. patent application Ser. No. 14/111,410, filed Oct. 11, 2013, which is a National Phase of the International Application No. PCT/EP2012/056401, filed Apr. 10, 2012, and claims the benefit of Belgian Patent Application No. BE 2011/0295, filed May 16, 2011, and provisional U.S. Patent Application No. 61/476,826, filed Apr. 11, 2011. All of the above listed applications are hereby incorporated by reference herein in their entireties.

TECHNICAL FIELD

The present invention relates to an apparatus for cutting products, such as for example food products or ingredients for pharmaceuticals or the like, comprising an impeller which can rotate concentrically within a cutting head to impart centrifugal force to the products to be cut.

The present invention further relates to a method for cutting a product in which the product is fed to a cutting head in which an impeller rotates concentrically to impart centrifugal force to the product.

The present invention further relates to systems, comprising one or more of such apparatuses, and related controllers and methods for controlling for such apparatuses and/or systems and computer program products implementing such methods.

BACKGROUND ART

An apparatus for cutting food products of the type comprising an impeller rotating inside a cutting head is known for example from U.S. Pat. No. 6,968,765. The cutting head is a stationary drum which is fitted with multiple cutting stations. Products cut with this technology include potato chips, cheese shreds, vegetable slicing, nut slicing and countless others. Centrifugal force is required to apply pressure to the product for stability when it passes the blades in the cutting stations. The centrifugal force is specific to the product, but it is known that too high centrifugal force can produce excess friction and compression on the product and that too low centrifugal force can cause poor knife engagement resulting in damage of the product. The desired cutting velocity is also specific for a given product.

In this type of apparatus, the cutting velocity is directly related to centrifugal force as both depend directly on the rotational speed of the impeller. However, the optimal impeller rotational speed from a viewpoint of centrifugal force is often different from the optimal impeller rotational speed from a viewpoint of cutting velocity. In those cases, upon selecting the impeller rotational speed a trade-off has to be made between more optimal centrifugal force and more optimal cutting velocity.

DISCLOSURE OF THE INVENTION

It is an aim of the present invention to provide an improved apparatus for cutting products of the type comprising an impeller rotating inside a cutting head.

It is another aim of the present invention to provide an improved method for cutting products by means of a cutting head in which an impeller rotates.

It is another aim of the present invention to provide an improved method of controlling of and a related controller for an apparatus for cutting products, and further to provide an improved method of controlling of and a related controller for a system, comprising a plurality of apparatuses for cutting products. These and other aims are achieved according to the invention as defined in the claims.

As used herein, "rotational speed" is intended to mean the speed at which an object rotates around a given axis, i.e. how many rotations the object completes per time unit. A synonym of rotational speed is speed of revolution. Rotational speed is commonly expressed in RPM (revolutions per minute).

As used herein, "cutting velocity" is intended to mean the speed at which a cutting element cuts through a product or alternatively states the speed at which a product passes a cutting element. Cutting velocity is commonly expressed in m/sec.

As used herein, a "cutting element" is intended to mean any element which is configured for cutting a particle or a piece from an object or otherwise reducing the size of the object, such as for example a knife, a blade, a grating surface, a cutting edge, a milling element, a comminuting element, a cutting element having multiple blades, etc., the foregoing being non-limiting examples.

According to an aspect of the invention, which may be combined with other aspects described herein, the impeller is rotated by means of a first drive mechanism at a first rotational speed, which sets the centrifugal force imparted to the product. The cutting head is no longer stationary as in the prior art document U.S. Pat. No. 6,968,765 but can be rotated by means of a second drive mechanism at a second rotational speed. The second rotational speed is determined such with respect to the first rotational speed that the product is cut by the at least one cutting element at a predetermined cutting velocity. By determining the second rotational speed in relation to the first rotational speed, the cutting velocity is set. For example, if the cutting head and the impeller rotate in the same direction, the cutting velocity is proportional to the first rotational speed minus the second rotational speed. For example, if the cutting head and the impeller rotate in opposite directions, the cutting velocity is proportional to the sum of the absolute values of the rotation speeds.

According to this aspect, the centrifugal force and the cutting velocity can be made independent from each other. The centrifugal force is still proportional to the first rotational speed of the impeller like in the prior art, but the cutting velocity is now dependent on the first rotational speed of the impeller and the second rotational speed of the cutting head. As a result, by establishing the first and second rotational speeds, both the centrifugal force and the cutting velocity can be optimized for the product which is to be cut and the need for making a trade-off like in the prior art can be avoided.

According to an aspect of the invention, which may be combined with other aspects described herein, the first and second drive mechanisms are provided with controls for adjusting the first and second rotational speeds within respectively a first range and a second range. In this way, the cutting velocity and the centrifugal force can be established for a wide range of products. The controls can comprise a user interface, by means of which the user can set the first and second rotational speeds. The controls can also be adjusted by means of another device, such as for example a PLC which takes a feedback input from sensors which sense for example temperature, product density, or other parameters, and on the basis thereof adjusts the rotational speeds. Another example is the use of the apparatus for cutting potato chips in combination with a fryer for frying the potato chips. In this case the controls can be adjusted on the basis of fryer requirements. One such requirement is for example a supply of potato chips to the fryer which is as uniform as possible, which means that the cutting apparatus has to be speeded up or slowed down to a given extent at times. Up to now, this speeding up or slowing down could lead to a significant amount of miscuts and product damage. With the apparatus of the invention, this can be minimised, as the centrifugal force can be optimised.

According to an aspect of the invention, which may be combined with other aspects described herein, the first drive mechanism comprises a first drive shaft by which the impeller is driven and the second drive mechanism comprises a second drive shaft by which the cutting head is driven, the second drive shaft being hollow and the first drive shaft being rotatably mounted within the second drive shaft. This has the advantage that the impeller and the cutting head are driven from the same side, e.g. the bottom side, leaving the top side unobstructed for feeding the product into the cutting head.

According to an aspect of the invention, which may be combined with other aspects described herein, the first and second drive mechanisms can have separate motors, so that the rotation of the impeller is entirely independent from the rotation of the cutting head. This has the advantage that the cutting velocity is totally independent of the centrifugal force.

In preferred embodiments wherein the apparatus has separate motors, the impeller is directly driven by the first motor of the first drive mechanism and the cutting head is directly driven by the second motor of the second drive mechanism. This has the advantages that any intermediate drive components can be avoided and the construction can be simplified. Preferably, in such embodiments, the base comprises a post with a first arm carrying the first motor with the impeller and a second arm carrying the second motor with the cutting head, the second arm being movably mounted to the post in such a way that the cutting head can be removed from around the impeller. Preferably, in such embodiments, the rotation of the impeller inside the cutting head is stabilised by means of a spring-loaded pin on the impeller which fits into a tapered hole in the centre of the cutting head, or vice versa.

In other embodiments, the first and second drive mechanisms can have a shared motor, which drives the rotation of both the impeller and the cutting head, and a gearbox, by means of which the difference between the first rotational speed of the impeller and the second rotational speed of the cutting head can be set. The gearbox can have multiple gears, so that different ratios between the first and second rotational speeds can be set.

In preferred embodiments, the cutting head and the impeller can be oriented to rotate around a vertical axis or a horizontal axis. However, other angles with respect to horizontal are also possible.

In preferred embodiments, the cutting head and the impeller are mounted on a tillable part of the base, by means of which the rotation axis of the cutting head and the impeller can be tilted to different angles. In this way, the orientation of the rotation axis can be adapted.

According to an aspect of the invention, which may be combined with other aspects described herein, the cutting head comprises a releasable locking mechanism for releasably fixing the cutting head to the base without using tools.

According to an aspect of the invention, which may be combined with other aspects described herein, the cutting head can be made stationary if desired, for example for use in conjunction with a dicing unit which is mounted at the outside of the cutting head.

According to an aspect of the invention, which may be combined with other aspects described herein, a system is provided, comprising: a plurality of apparatuses for cutting products, wherein each cutting apparatus comprises a base, a cutting head with at least one cutting element along the circumference of the cutting head for cutting products fed into the cutting head, the cutting head being rotatably fitted to the base, an impeller adapted for rotating concentrically within the cutting head to urge products fed into the cutting head towards the circumference of the cutting head by means of centrifugal force, a first drive mechanism for driving the rotation of the impeller at a first rotational speed setting the centrifugal force, and a second drive mechanism for driving the rotation of the cutting head at a second rotational speed, determined such with respect to the first rotational speed that the product is cut by the at least one cutting element at a predetermined cutting velocity; and a controller adapted to interact with the plurality of cutting apparatuses and adjust at least one of the first and second rotational speeds of the drive mechanisms of at least one of said apparatuses.

According to an aspect of the invention, which may be combined with other aspects described herein, a controller is provided, adapted to interact with the plurality of cutting apparatuses for cutting products, wherein each cutting apparatus comprises a base, a cutting head with at least one cutting element along the circumference of the cutting head for cutting products fed into the cutting head, the cutting head being rotatably fitted to the base, an impeller adapted for rotating concentrically within the cutting head to urge products fed into the cutting head towards the circumference of the cutting head by means of centrifugal force, a first drive mechanism for driving the rotation of the impeller at a first rotational speed setting the centrifugal force, and a second drive mechanism for driving the rotation of the cutting head at a second rotational speed, determined such with respect to the first rotational speed that the product is cut by the at least one cutting element at a predetermined cutting velocity, the controller comprising a computation device for determining at least one of the first and second rotational speeds of the drive mechanisms of at least one of said apparatuses.

According to an aspect of the invention, a computer program product, operable on a processing engine and related non-transitory machine readable storage medium storing the computer program products for use with or in the system or its controller or the user interface of such controller are provided.

BRIEF DESCRIPTION OF THE DRAWINGS

The invention will be further elucidated by means of the following description and the appended figures.

MODES FOR CARRYING OUT THE INVENTION

Figure 1:
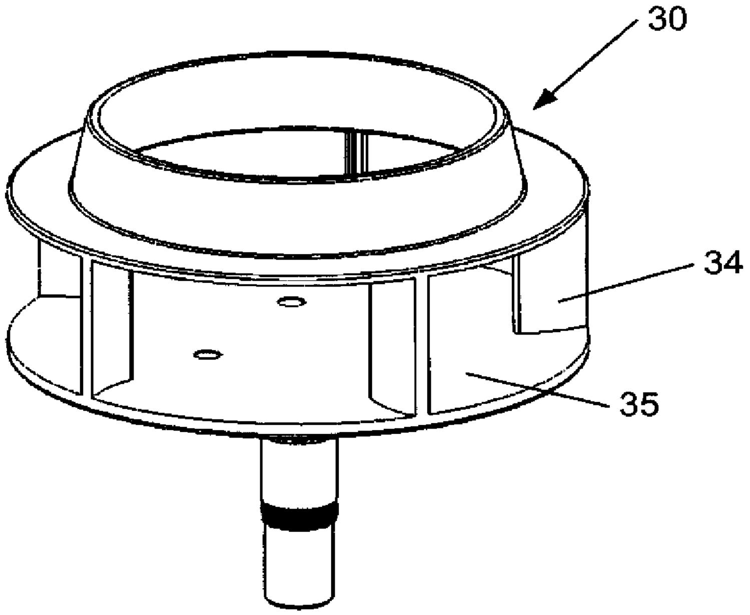
Fig. 1 (prior art)
FIG. 1 shows a perspective view of an impeller of a prior art cutting apparatus.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as “preferred” are to be construed as exemplary manners in which the invention may be implemented rather than as limiting the scope of the invention.

The term “comprising”, used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression “a device comprising A and B” should not be limited to devices consisting only of components A and B, rather with respect to the present invention, the only enumerated components of the device are A and B, and further the claim should be interpreted as including equivalents of those components.

Figure 2:
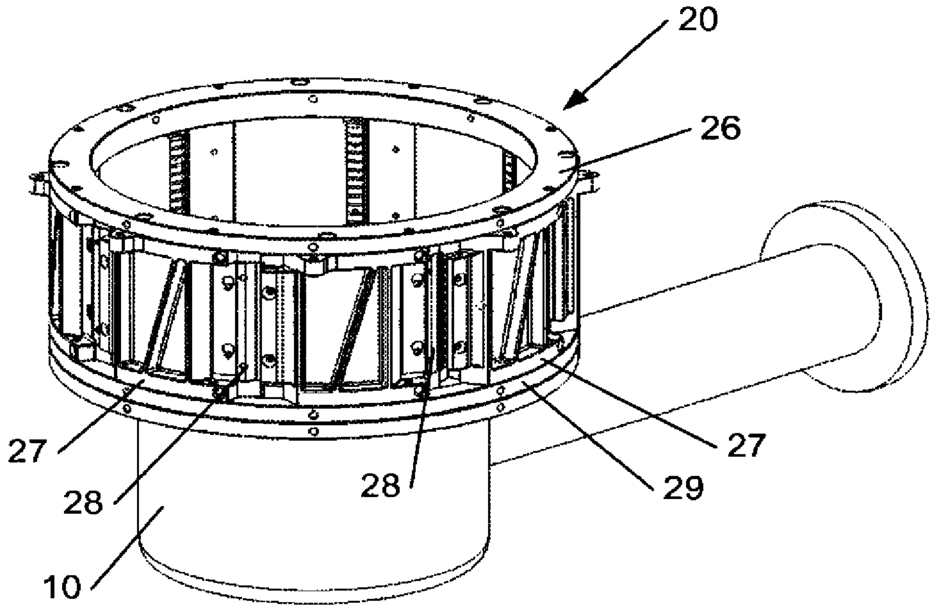
Fig. 2 (prior art)
FIG. 2 shows a perspective view of a cutting head of a prior art cutting apparatus.
Figure 3:
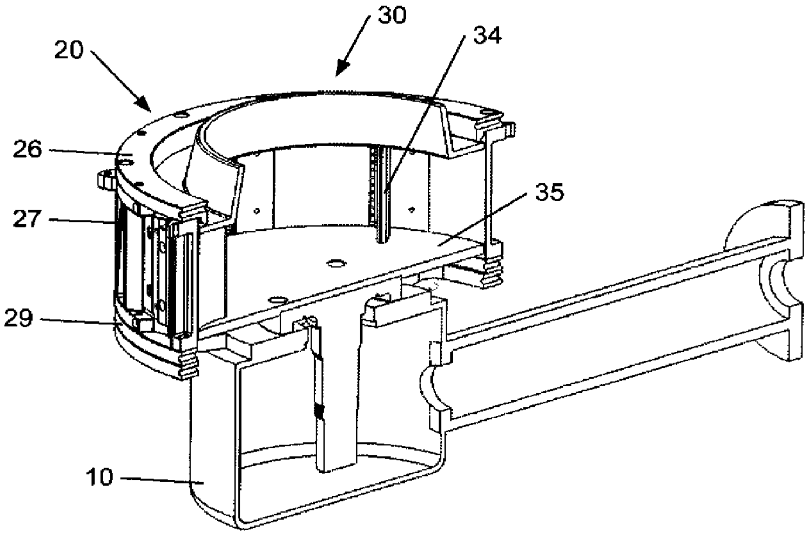
Fig. 3 (prior art)
FIG. 3 shows a cross sectional perspective view of the impeller and cutting head of the prior art apparatus, mounted inside each other.

FIGS. 1-3 respectively show a prior art impeller 30 and cutting head 20. The impeller 30 has a bottom plate 35 which is releasably fixed to a drive shaft of a prior art cutting apparatus for rotation inside the cutting head 20. The cutting head 20 is a cylindrical assembly comprising a top ring 26, a bottom ring 29 and a plurality of cutting stations 27 held between these rings, each comprising one cutting element 28. The assembly is held together by a number of bolts and fixed to the frame base 10 of the machine. The cutting stations 27 are tillable for adjusting the gap between the cutting element 28 and an opposite part at the rear of the subsequent cutting station, i.e. for adjusting the thickness of the part which is cut off. The top sides of the cutting head 20 and impeller 30 are open. In use, product to be cut is supplied into the cutting head from this open top side, lands on the bottom plate 35 of the impeller and is moved towards the cutting elements 28 firstly by centrifugal force, which is imparted to the product by the rotation of the impeller 30, and secondly by the paddles 34 of the impeller. In the prior art cutting apparatus, the cutting head 20 is stationary.

The cutting apparatus shown in FIGS. 4-8 is a first embodiment of a cutting apparatus according to the invention. It comprises a base 100 which carries a rotatable cutting head 200 and an impeller 300, adapted for rotating concentrically within the cutting head. A first drive mechanism, which is constituted by a first drive shaft 301, drive belt 302 and motor 303, is provided for driving the rotation of the impeller 300. A second drive mechanism, which is constituted by a second drive shaft 201, drive belt 202 and motor 203, is provided for driving the rotation of the cutting head. The first and second drive shafts are concentrically. The second drive shaft 201 which drives the cutting head 200 is rotatably mounted by means of bearings 104, 105 inside a stationary outer bearing housing 103, which forms part of the base 100. The first drive shaft 301 which drives the impeller is rotatably mounted by means of bearings 106, 107 inside the first drive shaft 201. As shown, these bearings 104-107 are tapered roller bearings, slanting in opposite directions, which is preferred in view of withstanding the forces which occur during operation of the apparatus. Alternatively, angular contact bearings could be used, or any other bearings deemed suitable by the person skilled in the art.

The base 100 comprises an arm 101, which is rotatably mounted on a post 102, so that the cutting head 200 and impeller 300 can be rotated away from the cutting position for cleaning, maintenance, replacement etc.

Figure 4:
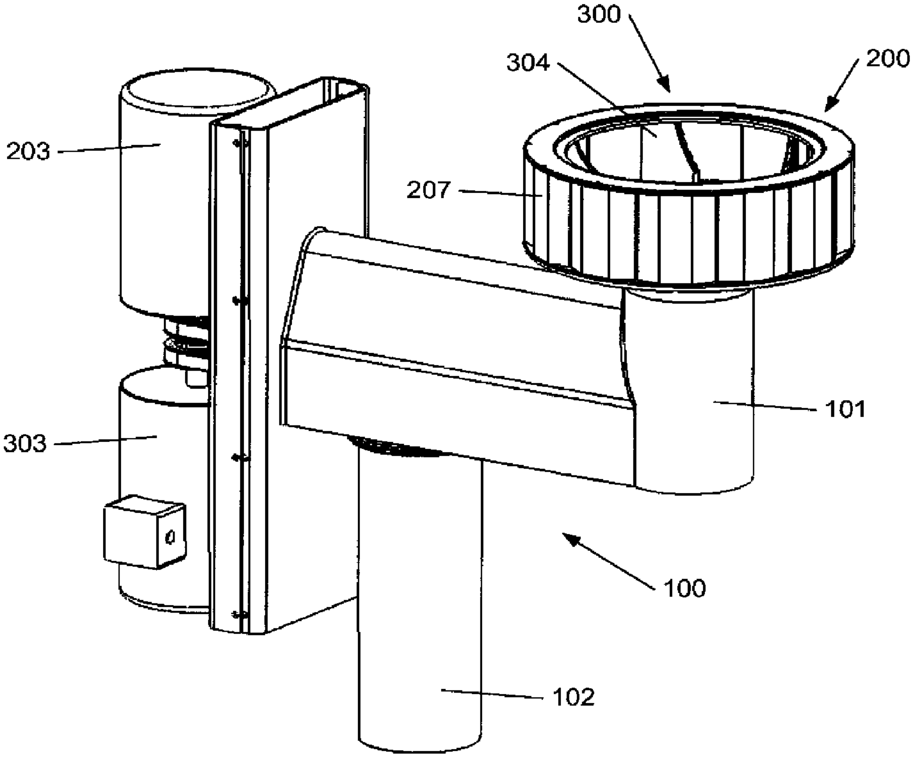
FIG. 4 shows a perspective view of a first preferred embodiment of a cutting apparatus according to the invention.
Figure 5:
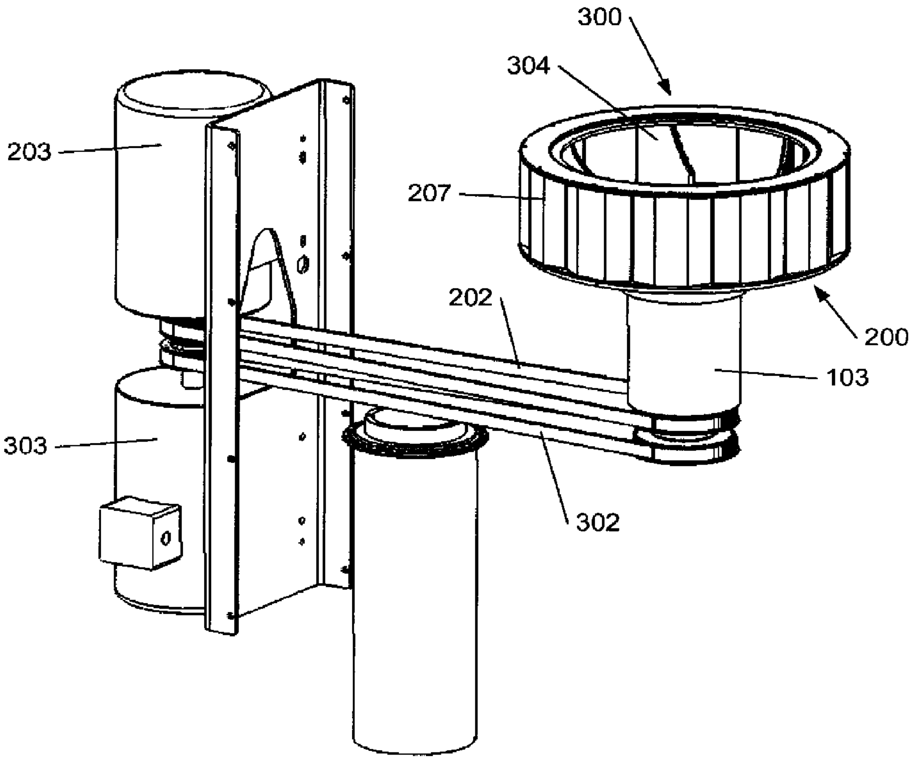
FIG. 5 shows a perspective view of the first embodiment of FIG. 4 with some parts removed in order to show its operation.
Figure 6:
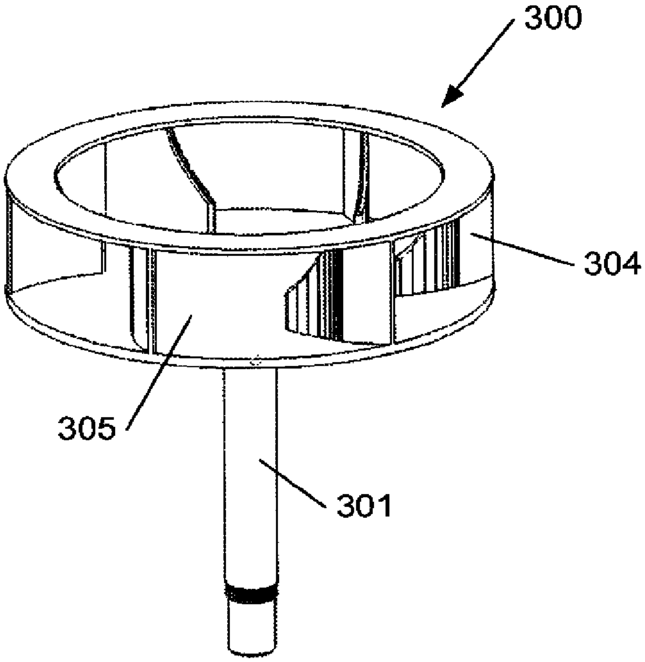
FIG. 6 shows a perspective view of the impeller of the first embodiment of FIG. 4.
Figure 7:
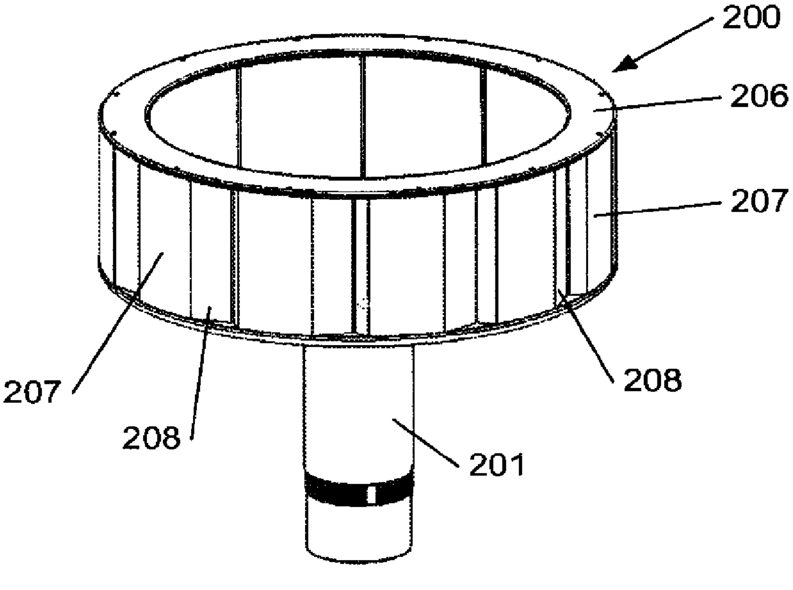
FIG. 7 shows a perspective view of the cutting head of the first embodiment of FIG. 4.
Figure 8:
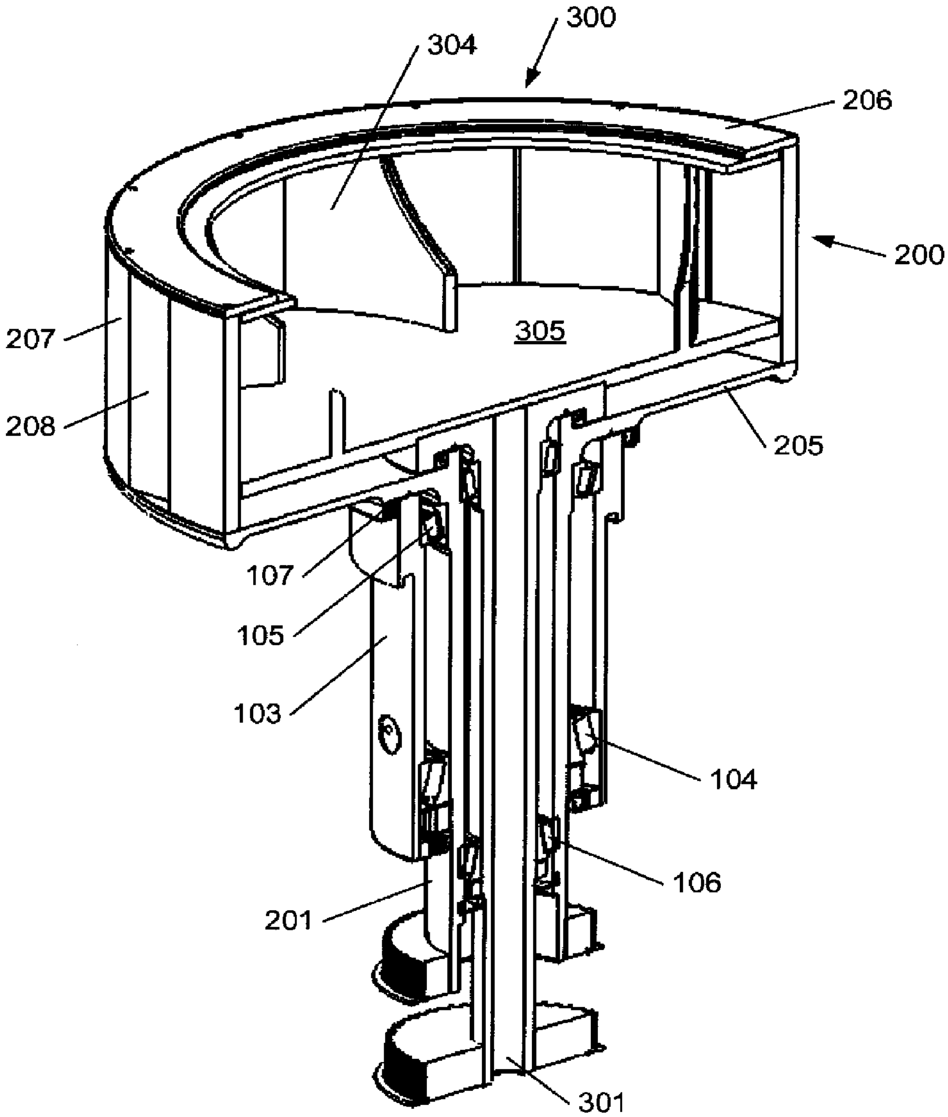
FIG. 8 shows a cross sectional perspective view of the cutting head, the impeller and drive shafts of the first embodiment of FIG. 4.

FIGS. 6-8 respectively show the impeller 300 and cutting head 200 fitted on the apparatus of FIGS. 4-5. The impeller 300 is releasably fixed to the first drive shaft 301 for rotation inside the cutting head 200. The cutting head 200 is a cylindrical assembly comprising a top ring 206, a bottom plate 205 and a plurality of cutting stations 207 held between these two parts, each comprising one cutting element 208. The assembly is held together by a number of bolts and releasably fixed to the second drive shaft 201. The cutting stations 207 are tillable for adjusting the gap between the cutting element 208 and an opposite part at the rear of the subsequent cutting station, i.e. for adjusting the thickness of the part which is cut off. The top sides of the cutting head 200 and impeller 300 are open. In use, product to be cut is supplied into the cutting head from this open top side, lands on the bottom plate 305 of the impeller and is moved towards the cutting elements 208 firstly by centrifugal force, which is imparted to the product by the rotation of the impeller 300, and secondly by the paddles 304 of the impeller.

The cutting head 200 is fitted with cutting elements 208, for example blades which make straight cuts in the product, for example to make potato chips. As an alternative, corrugated cutting elements could be fitted in order to make for example crinkle cut potato chips or shreds.

Figure 9:
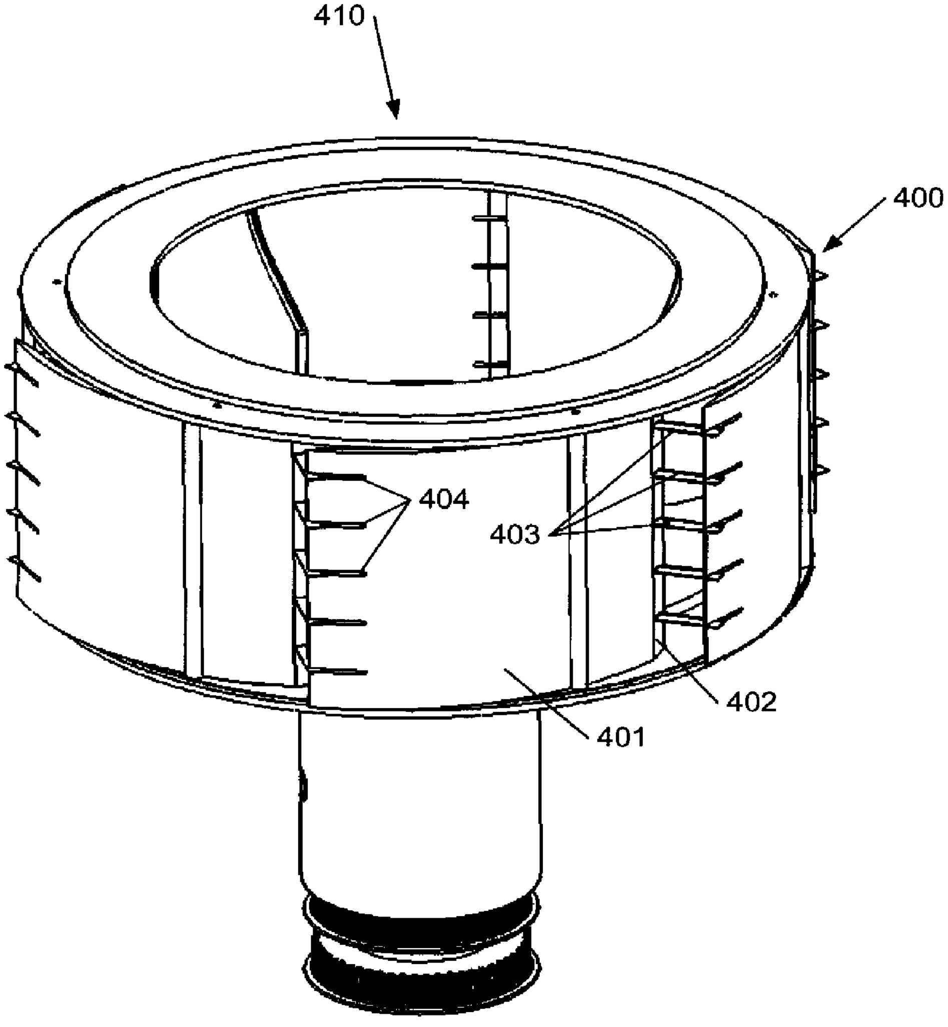
FIG. 9 shows a perspective view of an alternative cutting head and impeller which can be used on the cutting apparatus of FIGS. 4-5.
Figure 10:
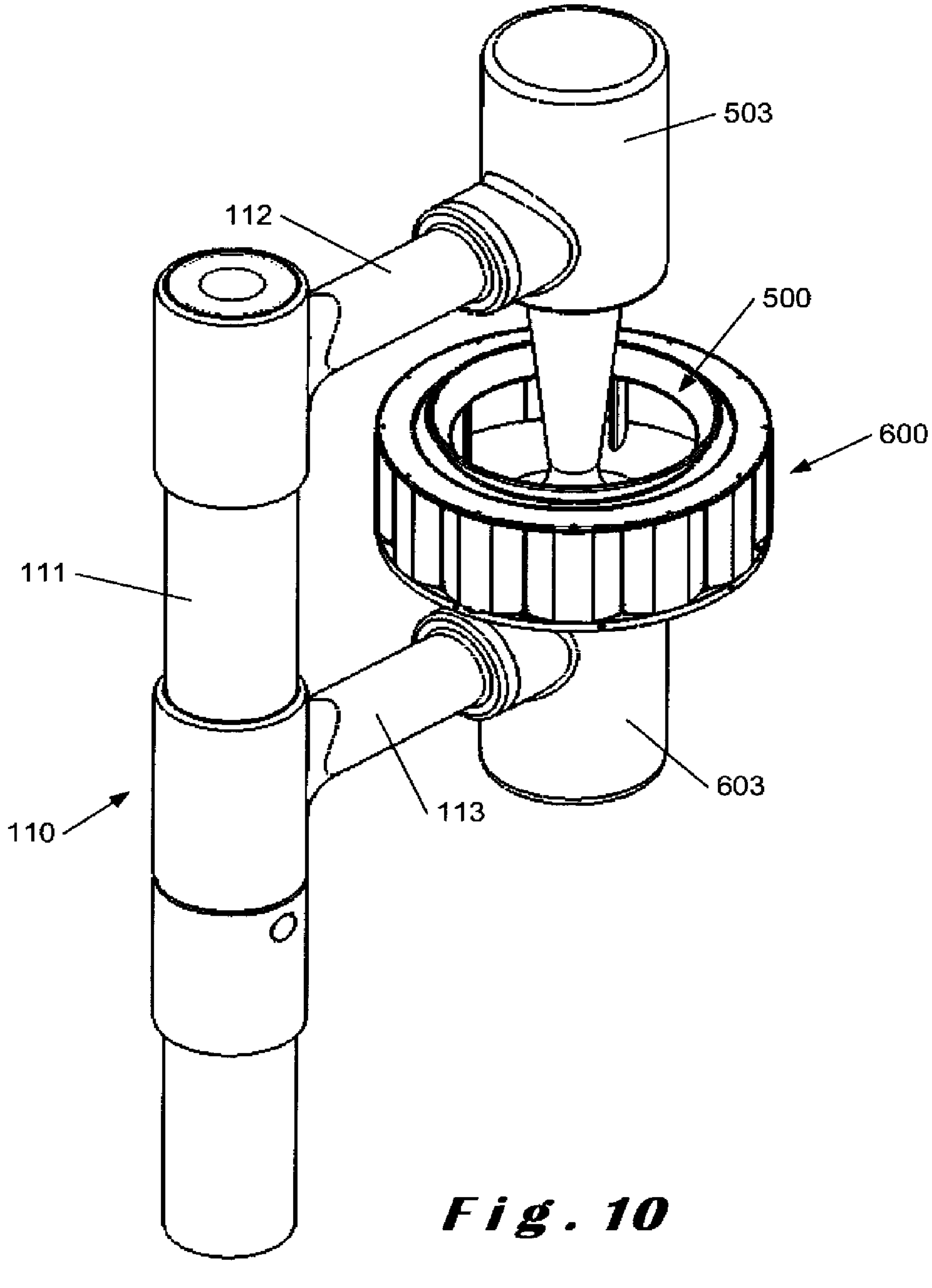
FIG. 10 shows a perspective view of a second preferred embodiment of a cutting apparatus according to the invention.
Figure 11:
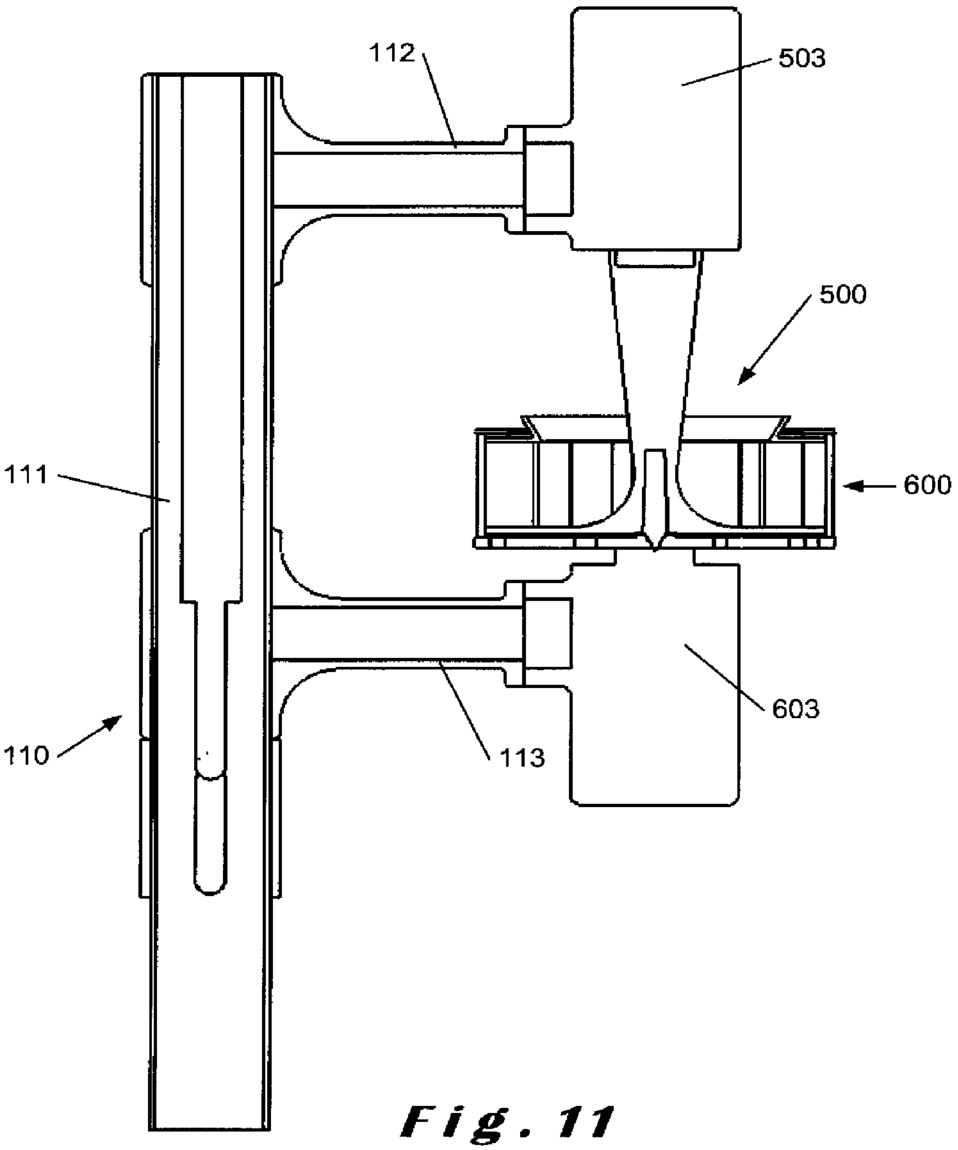
FIG. 11 shows a cross sectional view of the second embodiment of FIG. 10.
Figure 12:
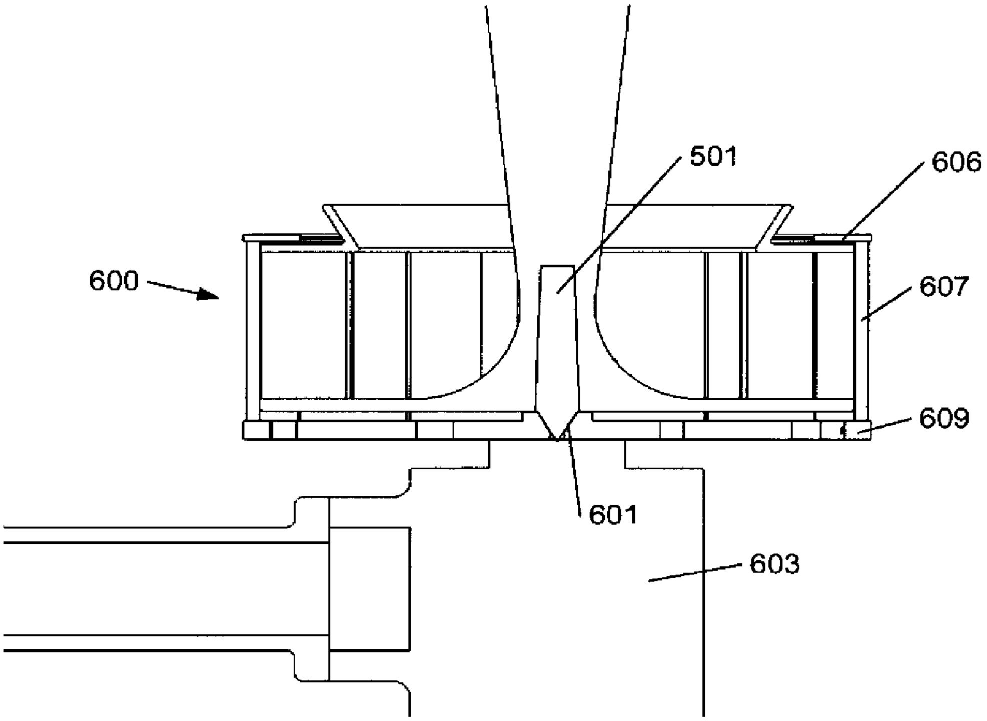
FIG. 12 shows a detail of FIG. 11.
Figure 13:
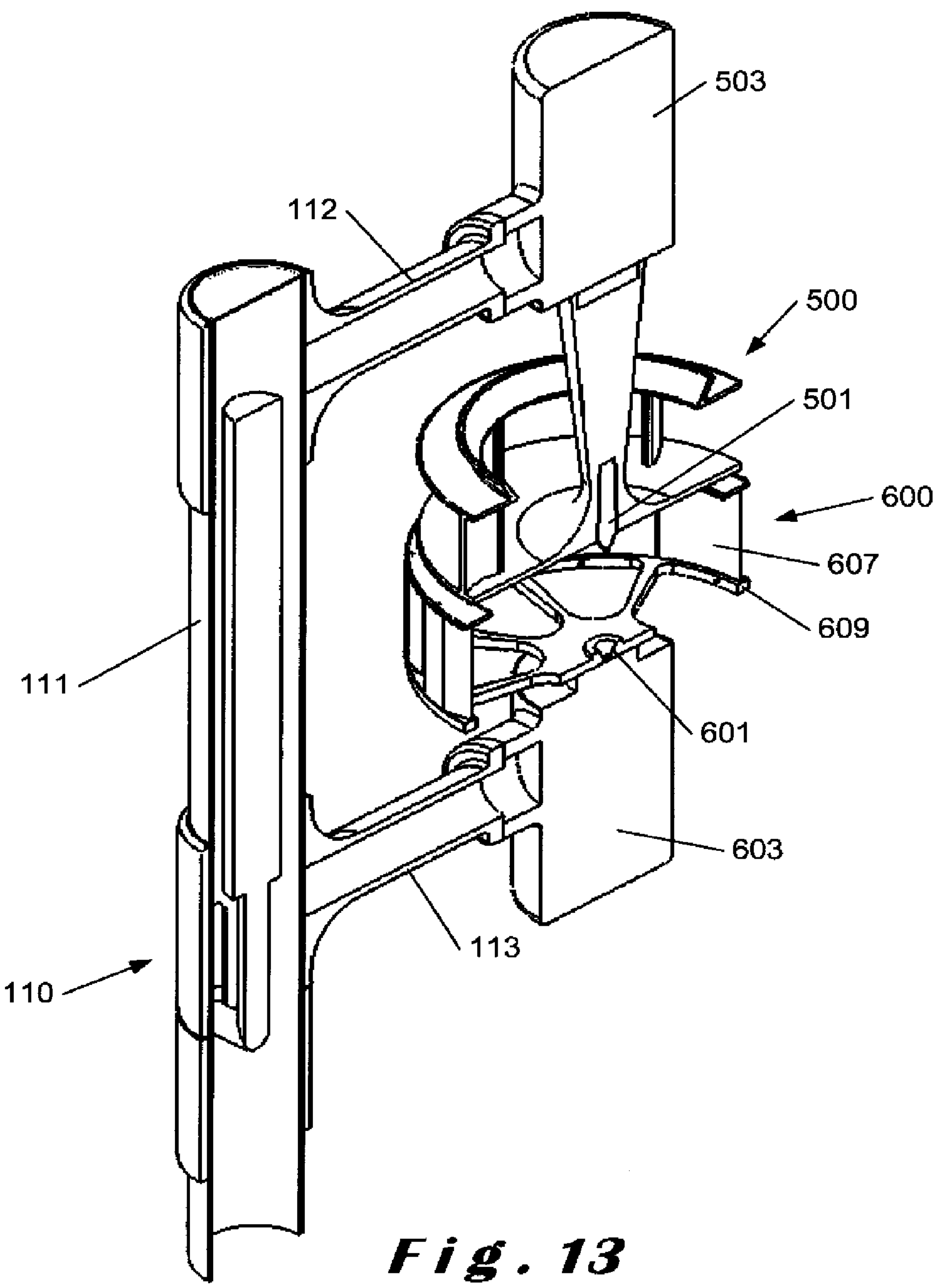
FIG. 13 shows a cross sectional perspective view of the second embodiment of FIG. 10, with the cutting head lowered for removal from the impeller.

FIG. 9 shows an alternative embodiment of a cutting head 400 with an adapted impeller 410 which is also capable of being used on the apparatus of FIGS. 4-5. The cutting head and impeller again are both rotatable and are driven by means of concentrically shafts in the same way as described above. The cutting stations 401 in this embodiment comprise each a larger blade 402 and a number of smaller, so-called julienne tabs 403 extending at an angle thereto, in particular substantially perpendicular thereto. In the embodiment shown, the julienne tabs 403 are welded onto the larger blades 402, but they could also be removably fixed thereto. In particular, in the embodiment shown the julienne tabs 403 are fixed to and extend perpendicular to the bevel of the larger blades 402, but they could also be fixed to the larger blades 402 behind the bevel. The front cutting edges of the julienne tabs 403 are slightly behind the front cutting edge of the larger blade 402, all at the same distance. Alternatively, they could also be located at varying distances from the front cutting edge of the larger blade 402, for example in a staggered or alternating configuration. The julienne tabs 403 are stabilised by means of slots 404 in the subsequent cutting station, so that during operation stresses can be relieved and the desired cut can be better maintained. The slots 404 extend a given distance into the rear end of the cutting stations 401 to accommodate for the variable positions of the julienne tabs 403 upon pivoting the cutting stations 401 for varying the gap. With this cutting head 400, the product is cut in two directions at once. It can for example be used to cut French fries from potatoes or to cut lettuce.

In further alternatives, cutting stations can be used with cutting edges for milling or comminuting products (e.g. salt, spices) or viscous liquids (e.g. butters, spreads). With these cutting stations, the apparatus can also be used for manufacturing pharmaceutical products like for example ointments.

In further alternatives, cutting stations can be used with grating surfaces for making grated cheese, or with any other cutting elements known to the person skilled in the art. The cutting apparatus of FIGS. 4-5 can even be used with the prior art cutting head and impeller of FIGS. 1-3.

Figure 21:
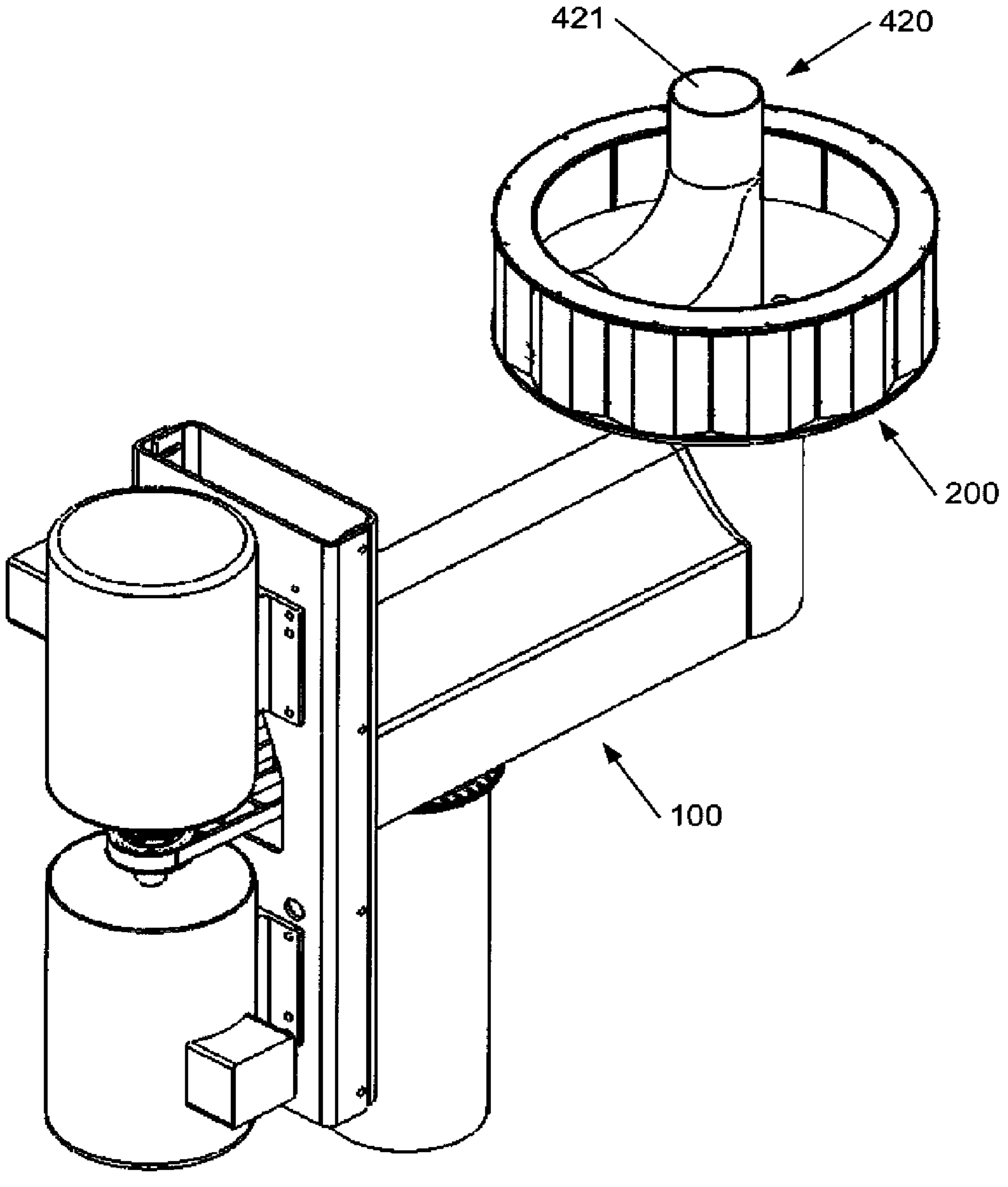
FIG. 21 shows a perspective view of a sixth preferred embodiment of a cutting apparatus according to the invention.
Figure 22:
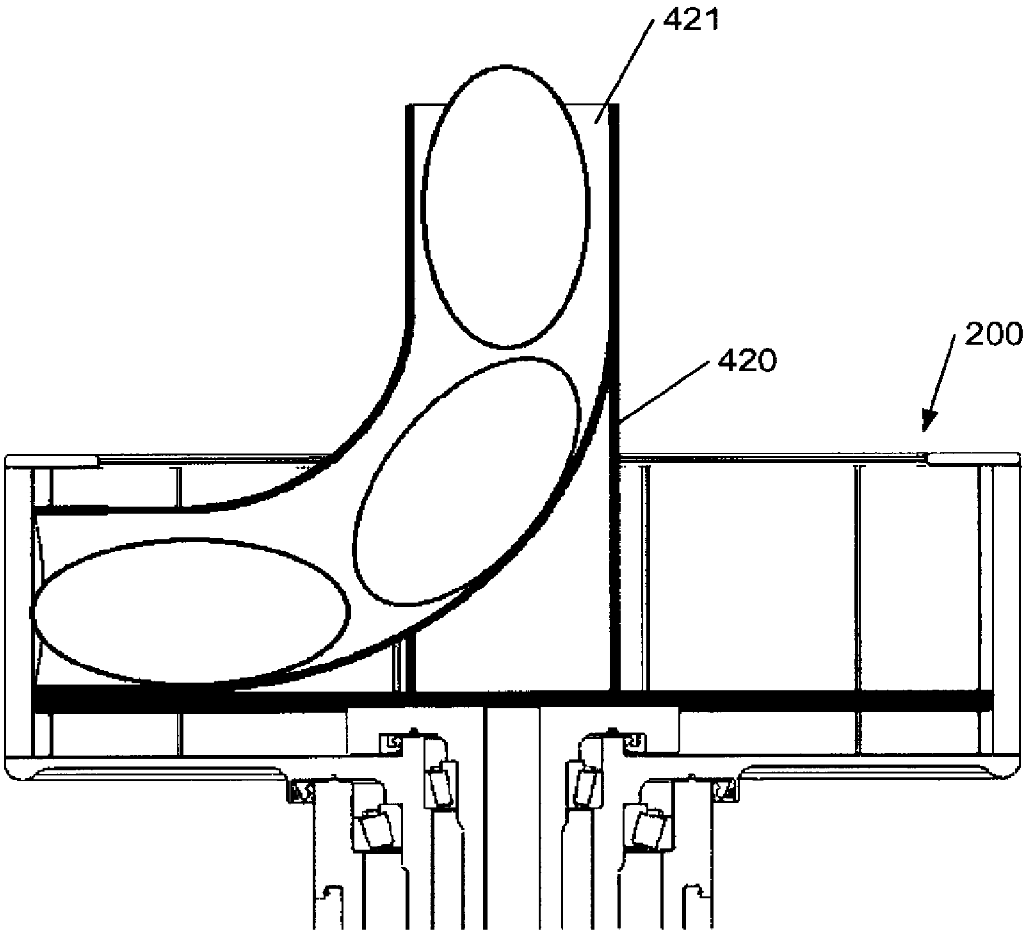
FIG. 22 shows a cross sectional view of the cutting head and impeller of the sixth embodiment of FIG. 21.

FIGS. 21 and 22 shows an alternative embodiment of an impeller 420 which can be used on the apparatus of FIGS. 4-5 with the same cutting head 200. The impeller 420 comprises a feed tube 421 which starts vertically in the centre of the impeller and bends towards the cutting head 200. This impeller 420 is intended for products for which it is desired to feed them towards the cutting head 200 in a directed way, such as, for example, products with an elongated shape of which it is desired their shorter sides face the cutting elements 208 and they are cut into chips having a more circular shape. The mouth of the feed tube can also be oriented at an angle with respect to the cutting elements 208, so that the products are cut into chips having a more oval shape. The impeller 420 is for example highly suitable for cutting larger, elongated potatoes into circular chips or for cutting onions into onion rings.

The cutting apparatus shown in FIGS. 10-14 has many features in common with the cutting apparatus shown in FIGS. 4-5. As a result, only the differences will be explained in detail.

The cutting apparatus shown in FIGS. 10-14 is mainly different in the driving mechanisms used to drive the impeller 500 and the cutting head 600. For both, an in line drive mechanism is used, i.e. the impeller 500 is directly fixed to the shaft of the motor 503 and the cutting head 600 is directly fixed to the shaft of the motor 603. This has the advantage that any intermediate drive components, such as the driving belts 202, 302 and the concentric shafts 201, 202 of the apparatus of FIGS. 4-5 are avoided, which simplifies the construction. The concentric rotation of the impeller 500 inside the cutting head 600 is stabilised by means of a spring-loaded pin 501 which fits into a tapered hole 601 in the centre of the cutting head 600.

The cutting head 600 is in this embodiment an assembly of a top ring 606, cutting stations 607 and a spider support 609 at the bottom. The cutting stations 607 are held between the top ring 606 and the spider support 609 like in the above described embodiment. The spider support 609 is used instead of a full bottom plate in order to save weight. The spider support can be connected to the shaft of the motor 603 by means of notches which are engaged by pins on the shaft. This can be a quick release engagement which can be fixed/loosened by for example turning the spider support 609 over +5°/−5° with respect to the motor shaft. Of course, the spider support 609 could also be bolted to the motor shaft, or releasably fixed by any other means known to the person skilled in the art.

Figure 14:
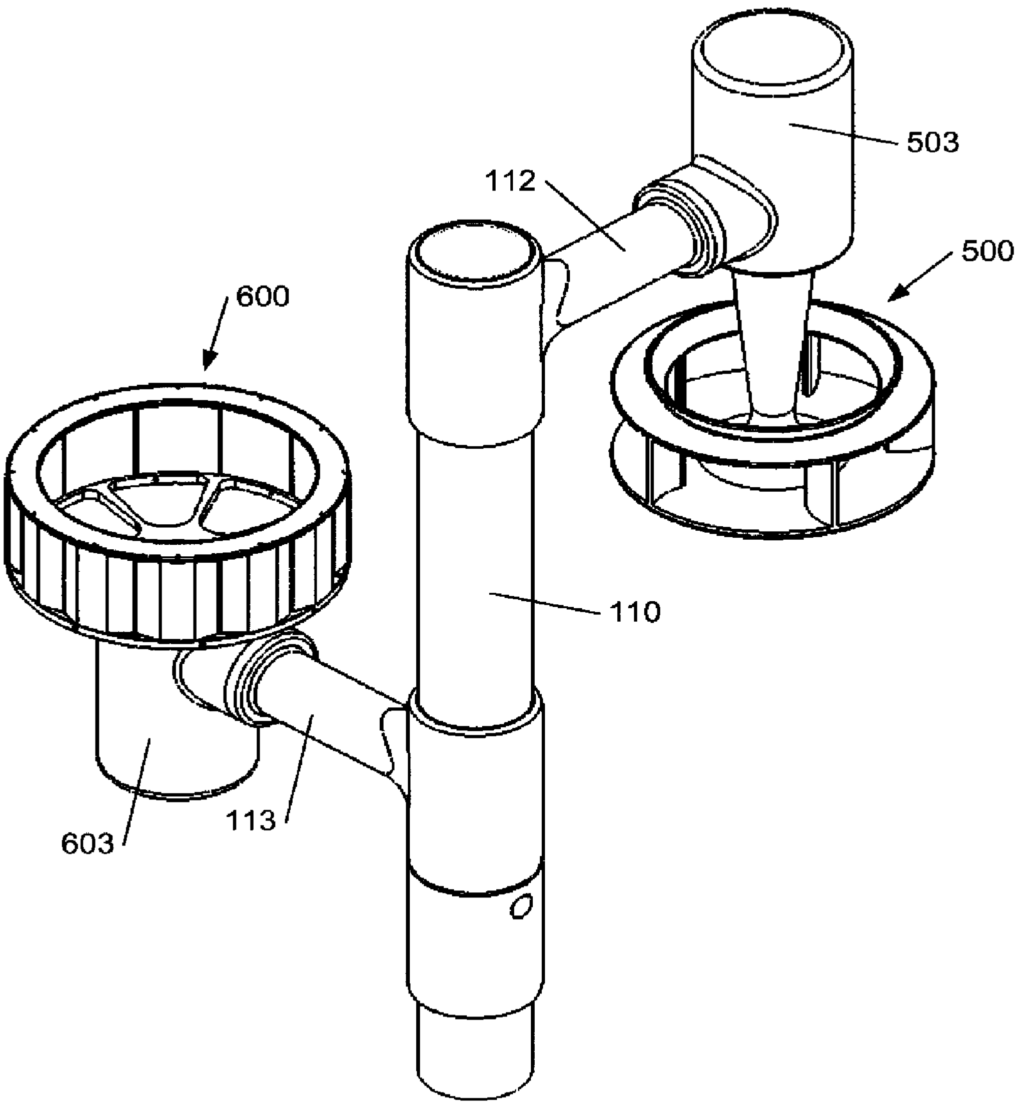
FIG. 14 shows a perspective view of the second embodiment of FIG. 10, with the cutting head lowered and rotated away from the impeller.

In this embodiment, the base 110 comprises a vertical post 111 with a fixed top arm 112 on which the impeller motor 503 is mounted with the shaft pointing downwards. The cutting head motor 603 is mounted on the post 111 with the shaft pointing upwards by means of a vertically movable and horizontally rotatable arm 113. In this way, the cutting head 600 can be removed from the impeller 500 for maintenance, replacement, etc. by subsequently moving the arm 113 downwards (FIG. 13) and rotating it in a horizontal plane (FIG. 14).

Figure 15:
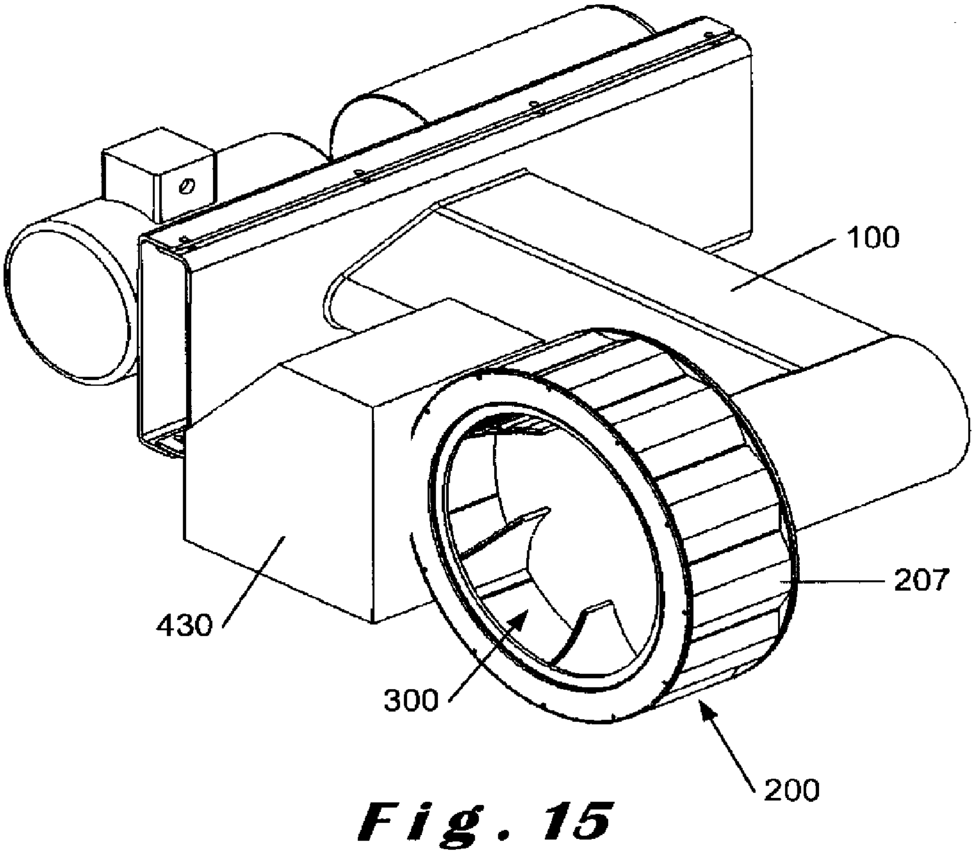
FIG. 15 shows a perspective view of a third preferred embodiment of a cutting apparatus according to the invention.

The cutting apparatus shown in FIG. 15 is the same as the one of FIGS. 4-5, but the cutting head 200 and the impeller 300 are oriented for rotation around a horizontal axis and are mounted adjacent a dicing unit 430. For dicing product by means of this apparatus, the cutting head 200 can here be locked to the base 100 by means of a releasable locking mechanism (not shown) to make it stationary. For dicing, the cutting stations 207 can all be tilted to a non-cutting position (zero gap) except for the one located at the dicing unit 430. A dicing unit is otherwise known in the art and therefore needs no further description here. So in this embodiment, the apparatus is convertible between a first mode of operation, namely with a stationary cutting head adjacent a dicing unit, and a second mode of operation with a rotating cutting head.

Figure 16:
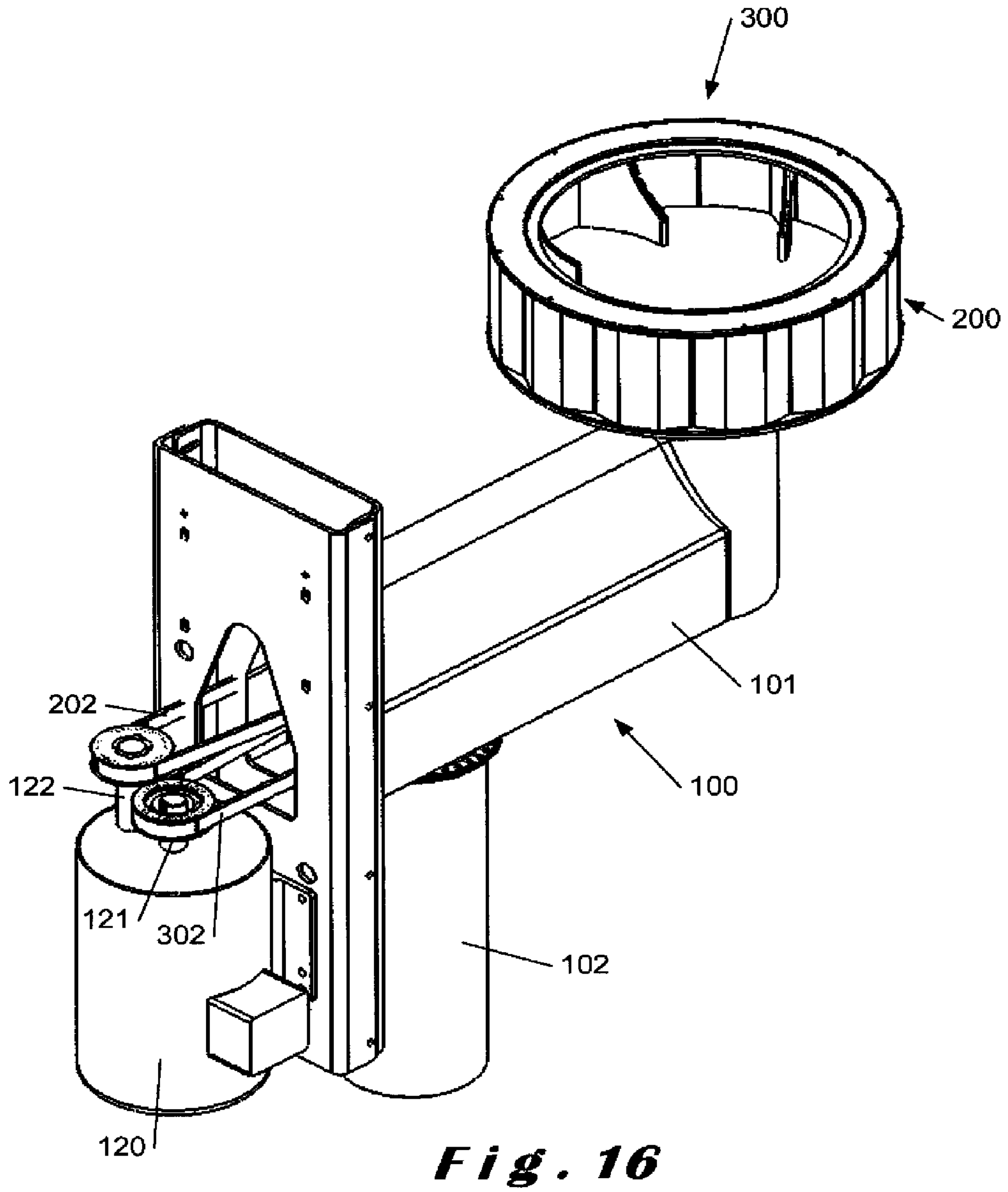
FIG. 16 shows a perspective view of a fourth preferred embodiment of a cutting apparatus according to the invention.

The cutting apparatus shown in FIG. 16 is similar to that of FIGS. 4-5 in that it has the same cutting head 200 and impeller 300 with concentrically drive shafts, mounted on a base 100 comprising an arm 101 which is rotatably mounted on a post 102. The drive mechanisms for the cutting head and the impeller are however different in the aspect that they comprise a shared motor 120 with two shafts: a first shaft 121 running the drive belt 302 for the impeller 300 and a second shaft 122 running the drive belt 202 for the cutting head 200. These shafts 121, 122 are internally coupled to each other by means of a gear mechanism which sets a predetermined ratio of the rotational speeds of the shafts and the rotational relationship, i.e. whether the cutting head and the impeller rotate in the same direction or not. So in this embodiment there is a fixed ratio between the first rotational speed of the impeller 300 and the second rotational speed of the cutting head 200, which means that this apparatus is configured for always cutting the same product or at least products for which the fixed ratio is optimal.

Figure 17:
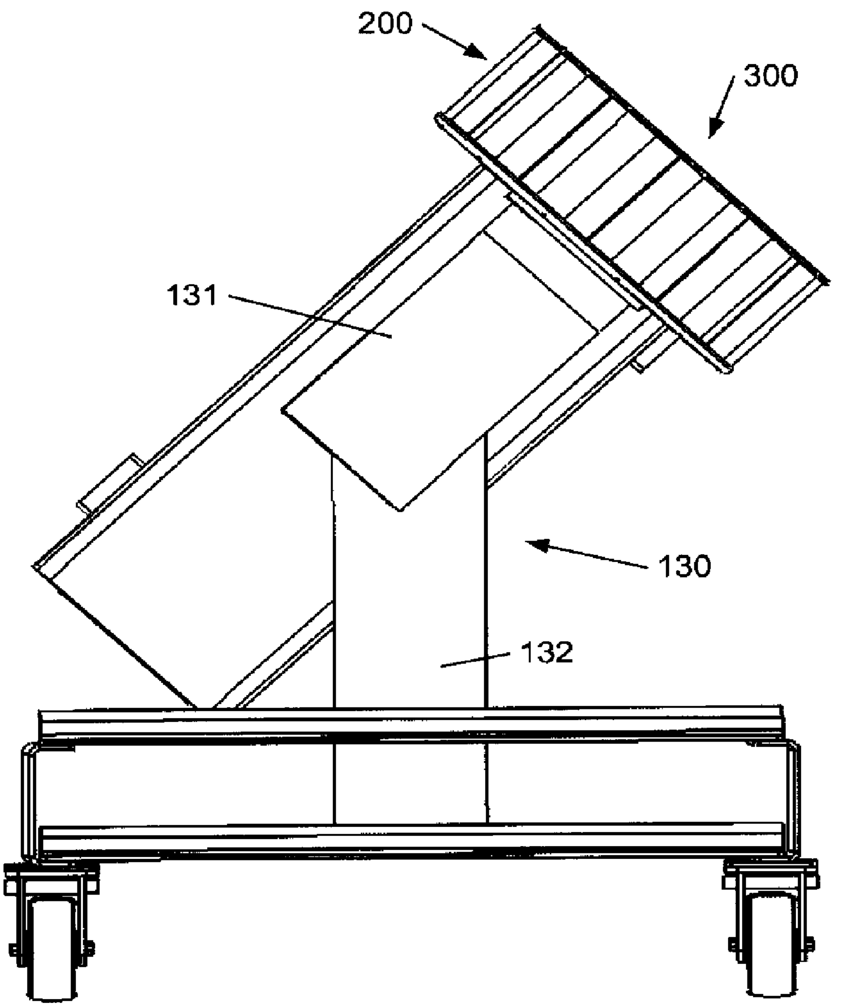
FIG. 17 shows a perspective view of a fifth preferred embodiment of a cutting apparatus according to the invention.

The cutting apparatus shown in FIG. 17 is similar to that of FIGS. 4-5 in that it has the same cutting head 200 and impeller 300 with concentrically drive shafts, mounted on a top part 131 of a base 130 which is tiltably fixed on a vertical post 132. In this way, the top part 131 carrying the cutting head 200 and impeller 300 can be tilted as a whole, so that the angle at which the cutting head 200 and the impeller 300 rotate is adaptable to the situation.

Below, the operation of the cutting apparatus of the invention will be discussed in general by reference to FIGS. 18-20. For the sake of simplicity, the reference numbers of the first embodiment of FIGS. 4-8 are used, but note that each of these situations can be applied to each of the above described embodiments as well as any other variations utilizing the principles of the present invention. In these figures, the cutting elements 208 of the cutting head 200 are oriented to impart cutting action in counter clockwise direction, i.e. the cutting elements cut through the product in counter clockwise direction or, alternatively stated, the product passes the cutting elements in clockwise direction. This is the mode of operation which is used in the art (with stationary cutting heads), but it is evident that the orientation of the cutting elements can be turned around to impart cutting action in clockwise direction. The arrows $v_{CH}$ and $v_{IMP}$ on these figures respectively represent the rotational speed of the cutting head and the rotational speed of the impeller.

Figure 18:
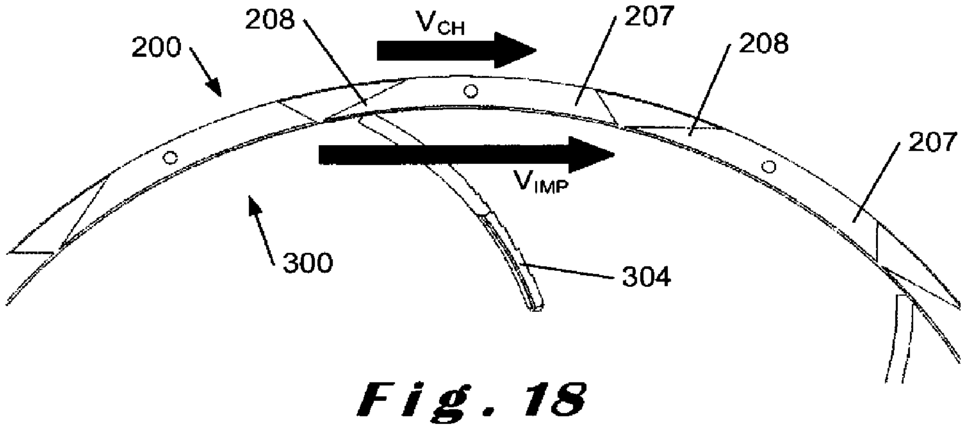
FIGS. 18-20 show top views of part of the cutting head and the impeller of an apparatus according to the invention to explain its operation.

In the situation of FIG. 18, the impeller 300 and the cutting head 200 rotate in the same direction, namely both clockwise. They rotate at different rotational speeds, i.e. the cutting head is not stationary with respect to the impeller. The first rotational speed $v_{IMP}$ of the impeller 300 is greater than the second rotational speed $v_{CH}$ of the cutting head 200, so that the paddles 304 of the impeller move the product towards the cutting elements 208. The first rotational speed of the impeller 300 sets the centrifugal force exerted on the product, i.e. the force with which the product is pressed against the interior of the cutting stations 207. The difference in rotational speed sets the cutting velocity with which the cutting elements 208 cut through the product, which is pushed towards them by means of the paddles of the impeller 304.

Figure 19:
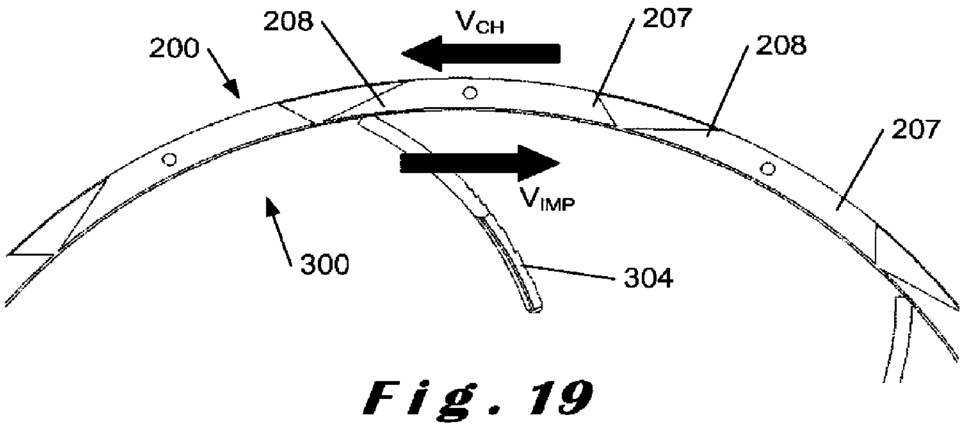

In the situation of FIG. 19, the impeller 300 and the cutting head 200 rotate in opposite directions, namely the impeller 300 rotates clockwise and the cutting head 200 rotates counter clockwise. In this situation, the first and second rotational speeds $v_{IMP}$ and $v_{CH}$ can be equal or different in absolute value. The first rotational speed $v_{IMP}$ of the impeller 300 sets the centrifugal force. The cutting velocity is related to the sum of the absolute values of the rotational speeds $v_{CH}$ and $v_{IMP}$, as their direction is opposite.

Figure 20:
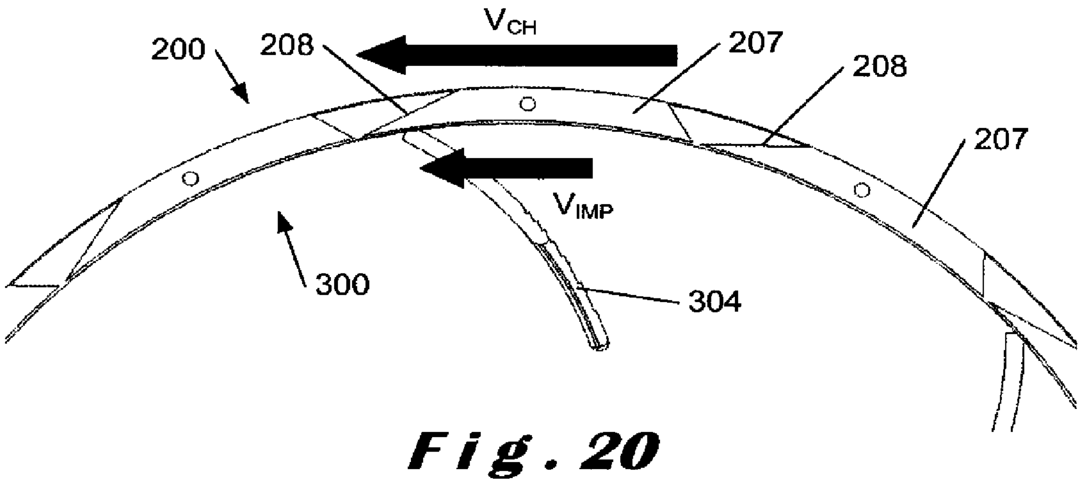

In the situation of FIG. 20, the impeller 300 and the cutting head 200 rotate in the same direction, namely both counter clockwise, with the impeller 300 at a smaller rotational speed than the cutting head 200. The first rotational speed $v_{IMP}$ of the impeller 300 sets the centrifugal force. As the first rotational speed $v_{IMP}$ is smaller than the second rotational speed $v_{CH}$, the cutting elements 208 move towards the paddles 304, so towards the product to be cut. The cutting velocity is determined by the difference between the first and second rotational speeds.

By way of example, some preferred settings for cutting potatoes are given. Table 1 below shows the relationship between the impeller rotational speed for a 178 mm radius and the centrifugal force experienced by potatoes of different weights. At 260 RPM, the centrifugal acceleration (g-force) is 131.95 m/s$^2$ (≅13 g) which corresponds to the centrifugal forces in the second column for the weights given in the first column; at 230 RPM, the centrifugal acceleration (g-force) is 103.26 m/s$^2$ (≅10 g) which corresponds to the centrifugal forces in the third column for the weights given in the first column.

TABLE 1

| | IMPELLER RPM | |
|---|---|---|
| POTATO WEIGHT | CENTRIFUGAL ACCELERATION 131.95 m/s$^2$ (≅13 g) @ 260 RPM & 178 mm RADIUS | CENTRIFUGAL ACCELERATION 103.26 m/s$^2$ (≅10 g) @ 230 RPM & 178 mm RADIUS |
| 0.70 kg | 92N | 72N |
| 0.45 kg | 59N | 46N |
| 0.30 kg | 40N | 31N |
| 0.20 kg | 26N | 21N |
| 0.10 kg | 13N | 10N |

It has been found that the impeller rotational speed is preferably controlled such that the g-force experienced by product being cut is in the range of 1 to 50 g's (1 g=9.8 m/s$^2$), although even higher g-forces may be used, for example in comminuting.

For cutting potatoes, a range of 3 to 30 g's appears to yield the best results.

For cutting potatoes, the cutting velocity is preferably in the range of 0.3 to 4.8 m/s, more preferably in the lower half of this range.

For cutting or shredding cheese products, also a range of 3 to 30 g's appears to yield the best results.

For cutting or shredding cheese products, the cutting velocity is preferably in the range of 0.3 to 5.5 m/s.

Importantly, with the apparatus and method of the invention, the centrifugal force can be reduced with respect to the prior art with a stationary cutting head. In such prior art apparatuses, when cutting cheese products the impeller is rotated at a relatively high speed (e.g. 400 RPM) in order to obtain the desired cutting velocity, but at such speeds the cheese products may be undesirably compressed against the interior of the cutting head. So in order to obtain a good quality of cutting, the cheese product needed to be cooled to a temperature of −4° C. to harden the product and avoid compression. With the apparatus of the invention, the centrifugal force can be reduced and the cutting velocity set independently therefrom, so that the cutting operation can occur at higher temperatures, i.e. temperatures of −3° C. or above, e.g. at 10° C., reducing the extent of cooling needed prior to cutting.

Examples of other products which can be cut in a more advantageous way with the apparatus and method of the invention are nut products, e.g. almonds, peanuts (e.g. to manufacture peanut butter) or other nuts; root products, e.g. ginger, garlic, or other; and also other products such as e.g. orange peel.

Figure 23:
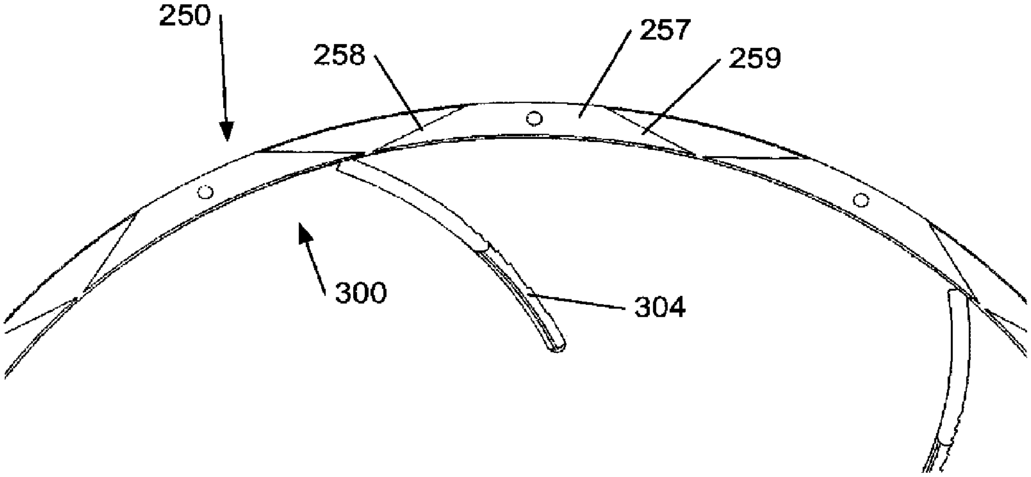
FIG. 23 shows a further alternative embodiment of a cutting head which can be used on apparatuses according to the invention.

FIG. 23 shows a further alternative embodiment of a cutting head 250 which can be used on apparatuses according to the invention, for example together with the same impeller 300 described above. The cutting head 250 comprises cutting stations 257 which have cutting elements 258, 259 at both ends. These cutting stations 257 are tillable for setting the gap and also for setting the direction in which the cutting head cuts, i.e. in clockwise or counter clockwise directions. In other words, this cutting head 257 is capable of cutting products by rotation in either direction, provided that the cutting stations are correctly set.

In further embodiments (not shown), the impeller drive shaft could also be made hollow, for example for accommodating a large bolt with which the impeller is fixed to the impeller drive shaft, or for connecting a liquid supply and supplying a liquid (e.g. water) to the cutting head from the bottom side through the impeller drive shaft, or both, in which case the bolt would also be hollow.

Figure 24:
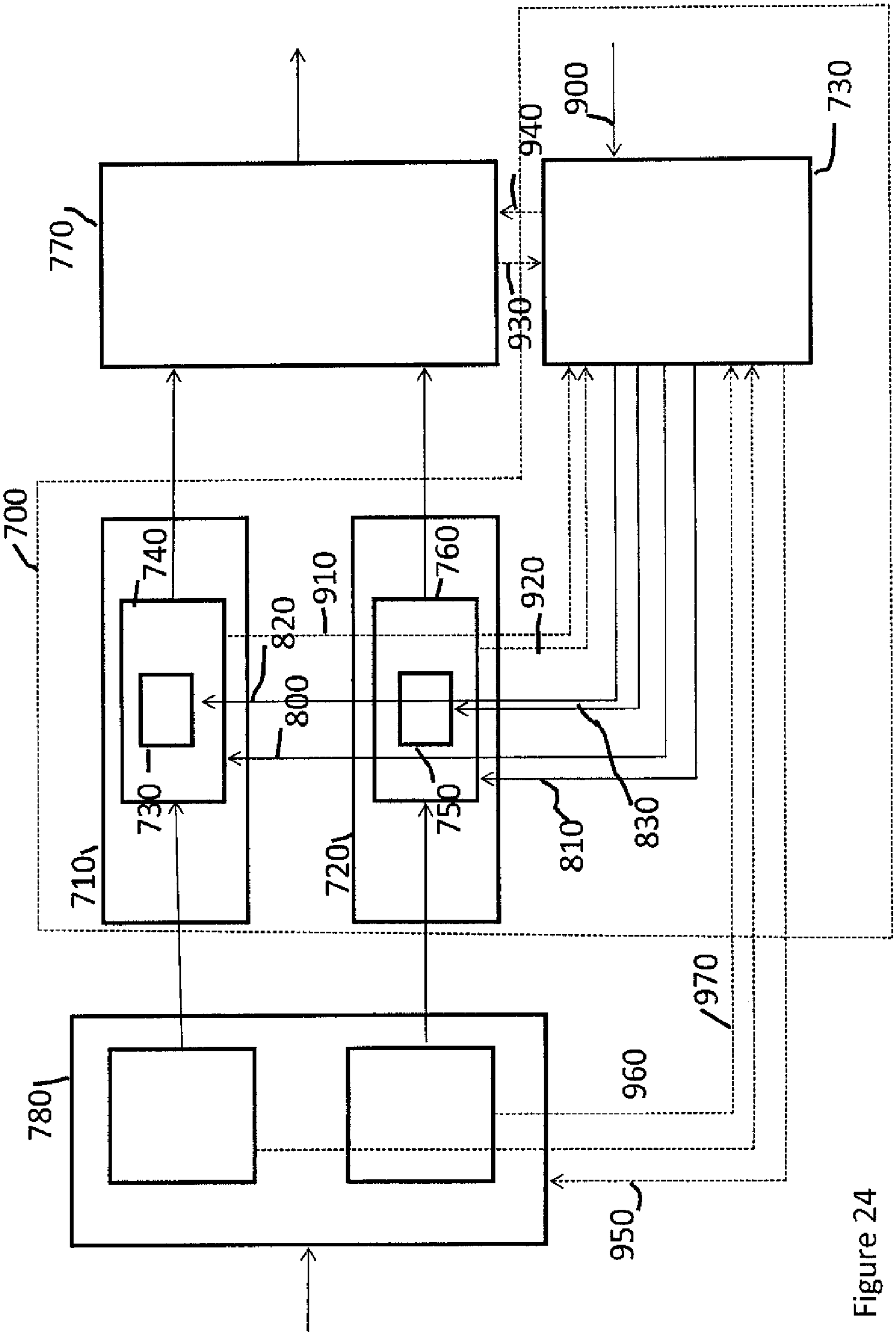
FIG. 24 shows a system of amongst other parts, a plurality of apparatuses according to the invention and related controller.

In an aspect of the invention, a system, comprising a plurality (typically 4 or 5 or 6 although the invention is not limited thereto) of apparatuses for cutting products and a controller adapted to interact with the plurality of cutting apparatuses is provided. FIG. 24 shows an embodiment of the invention relating to a system (700), comprising: a plurality of apparatuses (710) (720) for cutting products and a controller (730) adapted to interact with the plurality of cutting apparatuses, for instance but not limited thereto via signals (800) (810) to adapt operational parameters of said apparatuses. While each of the plurality of apparatuses for cutting products represent a separate production line for cutting products with a certain individual performance, the overall system of said plurality of apparatuses has a collective performance. The addition of a controller adapted to interact with said plurality of cutting apparatuses and thereby influence each of those their individual performance enables the control of the collective performance instead. Indeed instead of aiming at individual optimal performance, the invented system may optimize the collective performance (such as the collective cutting throughput and/or the cutting quality) and therefore exploits the extra control capabilities over the entire system to handle variations in and/or ageing of said apparatuses or more extreme situations as in case of shut down of one or more of said apparatuses (for instance by maintaining performance at a desired level). Alternatively the controller can implement a time varying performance to thereby optimize both performance versus costs of replacement of parts within said system.

Advantageously, according to this aspect, in case one of the lines of the system needs to be temporarily shut down for example for replacement of the knives, the individual throughput of the other lines can be temporarily increased to compensate for the one line being shut down and maintain the collective throughput constant. The controller can obtain this by adjusting either the first or the second rotational speeds of the cutting apparatuses of the other lines, to increase the differential and thereby the individual throughput. Advantageously (though not limited thereto), only the second rotational speeds can be adjusted, so that the g-force experienced by the products being cut is maintained at the same level throughout the downtime of said one line.

The system may further comprise one or more input devices adapted to communicate system related information to the controller (such as a user interface—see the user signal (900)), whereby the controller is adapted to interact with the plurality of cutting apparatuses to adapt operational parameters of said apparatuses according to the information received by the one or more input devices. Alternatively to a user interface and possibly in combination therewith one or more of said input devices are sensors adapted to communicate system related information to the controller (see sensor signals (910) (920)).

The described system is in particular useful (though not limited thereto) for use in cases wherein at least each cutting apparatus comprises a base, a cutting head (schematically represented by (740) (750) respectively) with at least one cutting element along the circumference of the cutting head for cutting products fed into the cutting head, the cutting head being rotatably fitted to the base, an impeller (schematically represented by (750) (760) respectively) adapted for rotating concentrically within the cutting head to urge products fed into the cutting head towards the circumference of the cutting head by means of centrifugal force, a first drive mechanism (not shown) for driving the rotation of the impeller at a first rotational speed setting the centrifugal force, and a second drive mechanism (not shown) for driving the rotation of the cutting head at a second rotational speed, determined such with respect to the first rotational speed that the product is cut by the at least one cutting element at a predetermined cutting velocity. Preferably more of such cutting apparatuses are available, optionally in combination with other cutting apparatuses. In the above described embodiment, the steering of the at least one of the first and second rotational speeds (by use of signals (800) (810) (820) (830) respectively), creates at least one, respectively two degrees of freedom, per apparatus and hence in cases with more of such apparatuses a multitude of degrees of freedom. It is in particular in such more complicated environment that the invented system provides opportunity to optimize the collective performance by use of a controller adapted to interact with the plurality of cutting apparatuses and adjust at least one of the first and second rotational speeds of the drive mechanisms of at least one of the apparatuses.

In an embodiment of the invention the user interface is adapted to communicate information related to (a) the product and/or the characteristics of the product, such as product density, dimensions and/or weight, being supplied to the plurality of cutting apparatuses and/or (b) the environmental conditions, such as temperature and humidity, wherein said system resides and the invention hence further exploit the capabilities of use of a complex multiple input and multiple output controller to build in higher level intelligence into the entire system by providing that the controller based on the higher level inputs as inputted via the user interface translates those into operational parameters of the underlying apparatuses their one or more (rotational) components such as the rotational speeds. One example would be, in case of a system for manufacturing potato crisps, an oil intake of the product leaving a frying, which is a measure for wear of the knives.

In an embodiment of the invention the one or more of said sensors are adapted to communicate information related to the operation of said apparatuses, more especially said impellers and/or said cutting heads and/or their respective drive mechanisms, such as throughput and/or cutting quality and/or said first and/or second rotational speeds. As such the controller can provide a feedback loop control with the set rotational speed. Alternatively each of said apparatuses has one or more local controllers and the overall system controller as discussed earlier provides steering signals such as set points to those.

While the controller as described above already provides the advantages of system level control and/or more intelligent control, the controller become required when dealing with the one or more typical physical constraints of the system at hand.

In one embodiment thereof, to ensure that a reasonable cutting velocity is obtained, said controller is adapted for ensuring that said first rotational speed being different from the corresponding second rotational speed within an apparatus. More in particular said controller is adapted for ensuring a predetermined (possibly time varying) difference between each first rotational speed and corresponding second rotational speed within an apparatus, such that a cutting velocity within a predetermined range is obtained, optionally said range is different per apparatus.

In another embodiment thereof said controller is adapted for setting each of the first rotational speeds such that the products are cut while experiencing a g-force within a predetermined, optionally per apparatus specific, range.

In a further embodiment the controller is adapted to perform a (multi-) objective optimization problem with multiple constraints (such a maximal or minimal rotational speeds or linear combinations thereof), for instance by performing a linear programming optimization technique. The controller is to be carefully designed to incorporate the physical limitations of the system at hand and/or be capable to translate the requirements of the to be cut products into operational parameters.

In yet another embodiment the system further comprises a first additional apparatus (770) for performing one or more post processing steps on the cut products, wherein at least one of the first and second rotational speeds are adjusted by the controller according to the additional apparatus requirements (either available implicitly or explicitly via signal (930)); and optionally the controller is further adjusted to adapt operational parameters (via signal (940)) of said first additional apparatus. For instance said additional apparatus is a frying apparatus, wherein at least one of the first and second rotational speeds are adjusted by the controller according to the frying apparatus requirements, such as the frying time of the cut products. The frying temperature could optionally be adapted. One will appreciate that in integrated system with multiple production lines with an apparatus combining the outcome of two or more of said production lines, an overall system controller is a necessity, further opening extra opportunity for optimized performance.

In yet another embodiment the controller is adapted for adjusting of operational parameters of a second additional apparatus (780) for performing one or more further preprocessing steps on the cut products, such as setting the throughput to each of said apparatuses (via signals (950)).

In yet another embodiment wherein one or more of said sensors (represented by the signals (910) (920) but also (960) (970)) are adapted to communicate more higher level information related to (a) the product and/or the characteristics of the product, such as product density, dimensions, weight and/or throughput, being supplied to the plurality of cutting apparatuses and/or (b) the environmental conditions, such as temperature and humidity, wherein said system resides. This information can be made available possible in part also via the user interface and the controller might be adapted to react in case of deviations between the sets of information. The sensors can be in part be available at each cutting apparatus (for instance an actual throughput measurement) while other sensor can be available at the preprocessing apparatus. One will appreciate that, in integrated system with multiple production lines with an apparatus combining the outcome of two or more of said production lines and now further extended with a pre-processing apparatus, overall system control further opens extra opportunity for optimized performance.

In an aspect of the invention a controller suitable for the tasks or methods described above is provided, moreover such controller comprising devices for inputting signals from one or more input devices adapted to communicate system related information to the controller and a computation device to determine the necessary operational parameters and output devices, generating the corresponding output signals based thereon. The controller can be a hardwired electronic system and/or a generic purpose computation unit or a dedicated digital signal processor or combinations thereof, equipped with the necessary software, executing the necessary steps of the tasks or methods described.

According to an aspect of the invention, which may be combined with other aspects described herein, as described above the first and second drive mechanisms are provided with controls for adjusting the first and second rotational speeds within respectively a first range and a second range. In this way, the cutting velocity and the centrifugal force can be established for a wide range of products. The controls can comprise a user interface, by means of which the user can set the first and second rotational speeds. The controls can also be adjusted by means of another device like a controller, such as for example a PLC which takes inputs from a user interface and/or a feedback input from sensors which sense for example temperature, product density, or other parameters for instance from other apparatuses connected to the apparatus under control, and on the basis thereof adjusts the rotational speeds.

According to an aspect of the invention, which may be combined with other aspects described herein, as described above the first and second drive mechanisms are provided each with local controls for adjusting the first and second rotational speeds within respectively a first range and a second range, whereby each of these controls can comprise a user interface, by means of which the user can set the first and second rotational speeds and/or each of these controls can also be adjusted by means of another device like a local controller. Further each of those local controls and local controllers can be under control of a global controller operating on both said drive mechanisms. Moreover in the context of a systems for a plurality of said apparatuses, an even more global controller operating, either directly or indirectly via local or per apparatus global controllers, on one or both drive mechanisms of two or more of said apparatuses, is provided. Said global controller can hence performing adjustments based on requirements or inputs of a further apparatus connected to said cutting apparatuses for example a supply of potato chips to the fryer which is as uniform as possible, which means that one or more of the plurality (two or more) of said cutting apparatuses has to be speeded up or slowed down to a given extent at times, particular in view of the operability of one or more of the other of said plurality of said cutting apparatuses. In a particular embodiment of the invention the speeding up or slowing down is performed in order to minimise the amount of miscuts and product damage, as the centrifugal force can be optimised and/or the speeding up or slowing down can be spread over more of said apparatuses.

In yet another aspect of the invention a method is proposed for use of a plurality of apparatuses for cutting products comprising the steps of feeding the products to the plurality of cutting apparatuses, wherein each cutting apparatus has a cutting head with at least one cutting element along the circumference of the cutting head for cutting the product, which is rotatably fitted to a base and which comprises an impeller adapted for rotating concentrically within the cutting head to urge the product towards the circumference of the cutting head by means of centrifugal force; rotating the impeller of each cutting apparatus at a first rotational speed setting the centrifugal force; rotating the cutting head of each cutting apparatus at a second rotational speed, determined such with respect to the first rotational speed of each impeller; adjusting at least one of the first and second rotational speed of at least one cutting apparatus based on information obtained by the at least one sensor such that the product is cut by the at least one cutting element of each cutting head at a predetermined cutting velocity.

In yet another aspect of the invention provides the use of a plurality of apparatuses for cutting products whereby said apparatuses are under a control of a global controller as described before, in particular wherein said apparatuses are as described before equipped with the capability of adapting the rotational speed of a cutting head.

The invention claimed is:

1. A system, comprising:

a plurality of apparatuses for cutting products, wherein each cutting apparatus comprises a base, a cutting head with at least one cutting element along the circumference of the cutting head for cutting products fed into the cutting head, the cutting head being rotatably fitted to the base, an impeller adapted for rotating concentrically within the cutting head to urge products fed into the cutting head towards the circumference of the cutting head by means of centrifugal force, a first drive mechanism for driving the rotation of the impeller at a first rotational speed setting the centrifugal force, and a second drive mechanism for driving the rotation of the cutting head at a second rotational speed, determined such with respect to the first rotational speed that the product is cut by the at least one cutting element at a predetermined cutting velocity which is the differential between the first and second rotational speeds;

a controller adapted to interact with the first and second drive mechanisms of each of the cutting apparatuses and adjust for each of said cutting apparatuses the first and second rotational speeds and the differential between the first and second rotational speeds; and one or more input devices adapted to communicate system related information to the controller, wherein the controller is adapted to adjust the first and second rotational speeds and the differential between the first and second rotational speeds according to the information received by the one or more input devices;

wherein one of said input devices is a sensor for detecting variations in a collective cutting throughput of the plurality of cutting apparatuses;

wherein in case of a detected variation in said collective throughput by said sensor, the controller is adapted for adjusting the differential between the first and second rotational speeds of at least one of the plurality of cutting apparatuses in order to provide that the collective cutting throughput is maintained at a desired level.

2. The system according to claim 1, wherein one of said input devices is a user interface.

3. The system according to claim 2, wherein said user interface is adapted to communicate information chosen from the group consisting of: information related to the product, information related to the characteristics of the product, such as product density, dimensions or weight, being supplied to the plurality of cutting apparatuses, information related to the environmental conditions, such as temperature and humidity, wherein said system resides, or combinations of such information.

4. The system of claim 1, wherein said input devices comprise at least one further sensor which is adapted to communicate information related to the operation of said apparatuses to the controller.

5. The system of claim 4, wherein said operation information relates to operation of at least one of said impellers, said cutting heads, and their respective drive mechanisms, and comprises at least one of throughput information, cutting quality information, said first and second rotational speeds.

6. The system of claim 1, wherein said controller is adapted for adjusting at least one of said first and second rotational speeds in order to provide that in case of detected shut down of a subset of at least one of said apparatuses, the operation of the overall system of said plurality of apparatuses is compensated for said detected shut down.

7. The system of claim 6, wherein said controller is adapted for adjusting said second rotational speeds to maintain the collective cutting throughput of said plurality of apparatuses at a predetermined level, while maintaining said first rotational speeds constant so as not to alter g-force experienced by said products being cut.

8. The system of claim 1, wherein said controller is adapted for ensuring that said first rotational speed being different from the corresponding second rotational speed within an apparatus.

9. The system of claim 1, wherein said controller is adapted for ensuring a predetermined difference between each first rotational speed and corresponding second rotational speed within an apparatus, such that a cutting velocity within a predetermined range is obtained.

10. The system of claim 1, wherein said controller is adapted for setting each of the first rotational speeds such that the products are cut while experiencing a g-force within a predetermined range.

11. The system of claim 1, further comprising a first additional apparatus for performing further post processing steps on the cut products, wherein at least one of the first and second rotational speeds is adjusted by the controller according to the additional apparatus requirements.

12. The system according to claim 11, wherein said additional apparatus being a frying apparatus, wherein at least one of the first and second rotational speeds are adjusted by the controller according to the frying apparatus requirements, such as frying time of the cut products.

13. The system according to claim 11, wherein at least one input device is provided with said additional apparatus and is adapted to communicate information related to said post processing to the controller.

14. The system according to claim 1, further comprising a second additional apparatus for performing pre-processing steps on the cut products, the controller further being adapted to setting operational parameters of said second additional apparatus.

15. The system according to claim 1, wherein the controller comprises a Programmable Logic Controller (PLC).

* * * * *